(12) United States Patent
Lisi

(10) Patent No.: US 10,315,622 B2
(45) Date of Patent: Jun. 11, 2019

(54) METHODS, DEVICES AND SYSTEMS FOR TRACKING VEHICLES

(71) Applicant: FOXTRAC INC., Laval (CA)

(72) Inventor: Marco Lisi, Laval (CA)

(73) Assignee: FoxTrac Inc., Laval (CA)

( * ) Notice: Subject to any disclaimer, the term of this patent is extended or adjusted under 35 U.S.C. 154(b) by 0 days.

(21) Appl. No.: 16/022,352

(22) Filed: Jun. 28, 2018

(65) Prior Publication Data

US 2018/0304855 A1 Oct. 25, 2018

Related U.S. Application Data

(63) Continuation of application No. 15/125,004, filed as application No. PCT/CA2015/000109 on Feb. 23, 2015, now Pat. No. 10,017,154.

(60) Provisional application No. 61/968,019, filed on Mar. 20, 2014.

(51) Int. Cl.
*G01S 13/75* (2006.01)
*B60R 25/102* (2013.01)
*B60R 25/33* (2013.01)
*G06Q 10/08* (2012.01)

(52) U.S. Cl.
CPC ............ *B60R 25/102* (2013.01); *B60R 25/33* (2013.01); *G01S 13/75* (2013.01); *G06Q 10/087* (2013.01)

(58) Field of Classification Search
CPC .... G06Q 10/087; B60R 25/102; B60R 25/33; G01S 13/75; G08G 1/0141; G08G 1/0965; G08G 1/205
USPC .............. 701/519; 340/572.4; 705/28, 14.49
See application file for complete search history.

(56) References Cited

U.S. PATENT DOCUMENTS

| | | | |
|---|---|---|---|
| 5,635,693 A | 6/1997 | Benson et al. |
| 6,427,913 B1 | 8/2002 | Maloney |
| 6,956,472 B1 | 10/2005 | Walcott, Jr. et al. |
| 7,202,785 B2 | 4/2007 | Maloney |
| 7,356,394 B2 | 4/2008 | Burgess |
| 7,511,619 B2 | 3/2009 | Allen |
| 7,681,921 B2 | 3/2010 | Mercer et al. |
| 8,302,847 B2 | 11/2012 | Randall et al. |
| 8,471,706 B2 | 6/2013 | Schuster et al. |

(Continued)

FOREIGN PATENT DOCUMENTS

| | | |
|---|---|---|
| CA | 2296370 | 2/1999 |
| CA | 2310623 | 6/1999 |

(Continued)

OTHER PUBLICATIONS

Asset Management, EAS, RFID, "Dealer Efficiency Through RFID Tagging", Feb. 2014.

(Continued)

*Primary Examiner* — Dalena Tran
(74) *Attorney, Agent, or Firm* — Bereskin & Parr LLP/S.E.N.C.R.L., s.r.l.

(57) ABSTRACT

There is provided a kit comprising a base member adapted to be releasably attached to an upper region of a vehicle; a pole member comprising a first end that is adapted to be releasably coupled to the base member; an identification tag adapted to be mounted on the pole member and at a predetermined distance from the first end; and a light adapted to be positioned on the pole member. Such a kit is quite useful for tracking vehicles such as vehicles left outdoors that can be covered with ice and snow.

20 Claims, 17 Drawing Sheets

(56) References Cited

U.S. PATENT DOCUMENTS

| | | |
|---|---|---|
| 8,543,283 B2 | 9/2013 | Boss et al. |
| 2002/0128769 A1 | 9/2002 | Der Ghazarian et al. |
| 2005/0073435 A1* | 4/2005 | Voeller .................. G07C 5/008 340/933 |
| 2006/0086872 A1 | 4/2006 | Fan |
| 2006/0229928 A1* | 10/2006 | Nix, Jr. ................ G06Q 10/063 705/7.31 |
| 2006/0292984 A1 | 12/2006 | Teate et al. |
| 2007/0285256 A1 | 12/2007 | Batra |
| 2008/0228346 A1 | 9/2008 | Lucas et al. |
| 2008/0231446 A1 | 9/2008 | Cresto |
| 2009/0128432 A1 | 5/2009 | Heo |
| 2011/0282564 A1 | 11/2011 | Park et al. |
| 2012/0019360 A1 | 1/2012 | McGinn et al. |
| 2012/0235810 A1 | 9/2012 | McMeekin et al. |
| 2012/0284209 A1 | 11/2012 | Duffy et al. |
| 2012/0306636 A1 | 12/2012 | Tieman et al. |
| 2013/0226413 A1 | 8/2013 | Cuddihy et al. |
| 2014/0028447 A1 | 1/2014 | Howard |
| 2014/0074667 A1 | 3/2014 | Smith |

FOREIGN PATENT DOCUMENTS

| | | |
|---|---|---|
| CA | 2359430 | 8/2000 |
| CA | 2399972 | 8/2001 |
| CA | 2443535 | 10/2002 |
| CA | 2473136 | 7/2003 |
| CA | 2427189 | 11/2003 |
| CA | 2514523 | 8/2004 |
| CA | 2519955 | 10/2004 |
| CA | 2572956 | 2/2006 |
| CN | 201974833 | 9/2011 |
| CN | 202650254 | 1/2013 |
| DE | 102008051691 | 9/2009 |
| JP | 2008123026 | 5/2008 |
| KR | 20080041764 | 5/2008 |

OTHER PUBLICATIONS

English Abstract of CN203038344 (U), "Residential area vehicle anti-theft alarming device based on radio frequency Identification device (RFID)", published on Jul. 3, 2013.

English Translation—Machine Generated of CN201974833 (U), "Identifier for vehicle", published on Sep. 14, 2011.

English Translation—Machine Generated of CN202650254 (U), "Vehicle identifying system", published on Jan. 2, 2013.

English Translation—Machine Generated of DE102008051691 (A1), "Device for detecting roof load arranged on vehicle roof, has detection unit, by which roof load is detected, where transponder of detection unit is arranged within roof area of vehicle", published on Sep. 17, 2009.

English Translation—Machine Generated of JP2008123026 (A), "Access control system", published on May 29, 2008.

English Translation—Machine Generated of KR20080041764 (A), "System for unguarded oil supply control", published on May 14, 2008.

Gao RFID Inc., "RFID Car Dealership Software (617007)", Feb. 2014.

English Abstract of CN203032802(U), "Community electro-car anti-theft monitoring system based on radio frequency dentification device (RFID)", published on Jul. 3, 2013.

English Abstract of CN103377408(A), "System and method for managing automobile information", published on Oct. 30, 2013.

* cited by examiner

METHODS, DEVICES AND SYSTEMS FOR TRACKING VEHICLES

CROSS-REFERENCE TO RELATED APPLICATIONS

The present application is a continuation application of U.S. Ser. No. 15/125,004 filed on Sep. 9, 2016 that is a 35 USC 371 national stage entry of PCT/CA2015/000109 filed on Feb. 23, 2015 and that claims priority on U.S. 61/968,019 filed on Mar. 20, 2014. These documents are hereby incorporated by reference in their entirety.

FIELD

The present subject-matter relates methods, devices and systems for tracking vehicles such as automobiles.

INTRODUCTION

It is typical in vehicle dealerships, vehicle maintenance garages, or vehicle manufacturing plants for a large number of vehicles to be located in one site. Moreover, the inventory of vehicles on-site may be constantly changing. For example, at a dealership, new stock of vehicles may arrive while other vehicles are being sold. For example, at a maintenance garage, a first set of vehicles leave the site when their required maintenance tasks are complete while another set of vehicles arrive on-site for their respective maintenance tasks. For example, at vehicle manufacturing plants, new vehicles are being produced while other vehicles are being transported to dealerships or other.

Due to space restrictions, it is typical for some on-site vehicles to be left outdoors. While vehicles are generally stored on-site, it is also typical for some vehicles to leave the site temporarily.

Each vehicle is typically paired with a corresponding key for starting the vehicle. In addition to tracking the stock of vehicles being kept on-site, it is also necessarily to track the stock of keys paired which each of the vehicles.

SUMMARY

It would thus be highly desirable to be provided with a device, system or method that would at least partially address the disadvantages of the existing technologies.

The embodiments described herein provide in one aspect an identification kit that includes a first tag member for mounting onto a rearview mirror of a vehicle and having formed thereon at least one first visual identifier displaying a unique identification code and a first passive RFID tag; and a second tag member for mounting onto a vehicle key, the second tag member having formed thereon at least one second visual identifier displaying the unique identification code and a second passive RFID tag.

The embodiments described herein provide in another aspect a method for tracking a vehicle, the method comprising: receiving a new vehicle tracking request for a given vehicle being associated with a given unique identification code; initializing a vehicle tracking operation, the operation associating at least a first remotely readable tag to the given unique identification code; intermittently reading at a plurality of reading devices a plurality of remotely readable tags each being associated with a respective unique identification code; and updating a current location of the given vehicle if the first remotely readable tag associated to the given unique identification code is read by a first of the plurality of reading devices, the current location being a location of the first reading device.

The embodiments described herein provide in another aspect a system for tracking a vehicle, the system comprising: a memory for storing a plurality of instructions; a process coupled to the memory, the processor configured for: receiving a new vehicle tracking request for a given vehicle being associated with a given unique identification code; initializing a vehicle tracking operation, the operation associating at least a first remotely readable tag to the given unique identification code; intermittently reading at a plurality of reading devices a plurality of remotely readable tags each being associated with a respective unique identification code; and updating a current location of the given vehicle if the first remotely readable tag associated to the given unique identification code is read by a first of the plurality of reading devices, the current location being a location of the first reading device.

The embodiments described herein provide in another aspect an identification device that includes a base member adapted to be releasably attached to an upper region of a vehicle, a pole member extending from the base member and an identification tag adapted to be read wirelessly and being positioned on the pole member at a predetermined distance from the base member.

The embodiments described herein provide in another aspect in another aspect a kit that includes a base member adapted to be releasably attached to an upper region of a vehicle, a pole member comprising a first end that is adapted to be releasably coupled to the base member, and an identification tag adapted to be mounted on the pole member and at a predetermined distance from the first end.

The embodiments described herein provide in another aspect a method of mounting an identification device to a vehicle. The method includes attaching a base member to an upper region of a vehicle and positioning a pole member coupled to the base member to a substantially upright position, whereby a remotely readable tag positioned on the pole member is positioned to a predetermined height above the upper region of the vehicle.

The embodiments described herein provide in another aspect a method for tracking a location of a vehicle. The method includes receiving a new vehicle tracking request for a given vehicle being associated with a given unique identification code and setting an absence permission for the unique identification code to disallowed, intermittently reading at a plurality of reading devices a plurality of remotely readable tags each being associated with a respective unique identification code, at least one of the plurality reading devices being a boundary reading device and one of the remotely readable tags being associated with the given unique identification code, and transmitting an alert if one of the at least one boundary reading devices reads the remotely readable tag associated to the given unique identification code while the absence permission for the given unique identification code is set to disallowed.

The embodiments described herein provide in another aspect a system for tracking a location of a vehicle, the system comprising a memory for storing a plurality of instructions and a processor coupled to the memory. The processor is configured for receiving a new vehicle tracking request for a given vehicle being associated with a given unique identification code and setting an absence permission for the unique identification code to disallowed, intermittently reading at a plurality of reading devices a plurality of remotely readable tags each being associated with a respective unique identification code, at least one of the plurality reading devices being a boundary reading device and one of the remotely readable tags being associated with the given unique identification code, and transmitting an alert if one of the at least one boundary reading devices reads the remotely readable tag associated to the given unique identification code while the absence permission for the given unique identification code is set to disallowed.

The embodiments described herein provide in another aspect an identification device comprising a first tag member for mounting onto a rearview mirror of a vehicle and having formed thereon on a first visual identifier displaying a unique identification code and a first passive RFID tag associated to the unique identification code, a second tag member for mounting onto a vehicle key, the second tag member being detachable from the first tag member and having formed thereon a second visual identifier displaying the unique identification code and a second passive RFID tag associated to the unique identification code, and a third tag member being detachable from the first tag member and having formed thereon a third visual identifier displaying the unique identification code.

DRAWINGS

The following drawings represent non-limitative examples in which.

DESCRIPTION OF VARIOUS EMBODIMENTS

Figure 1:
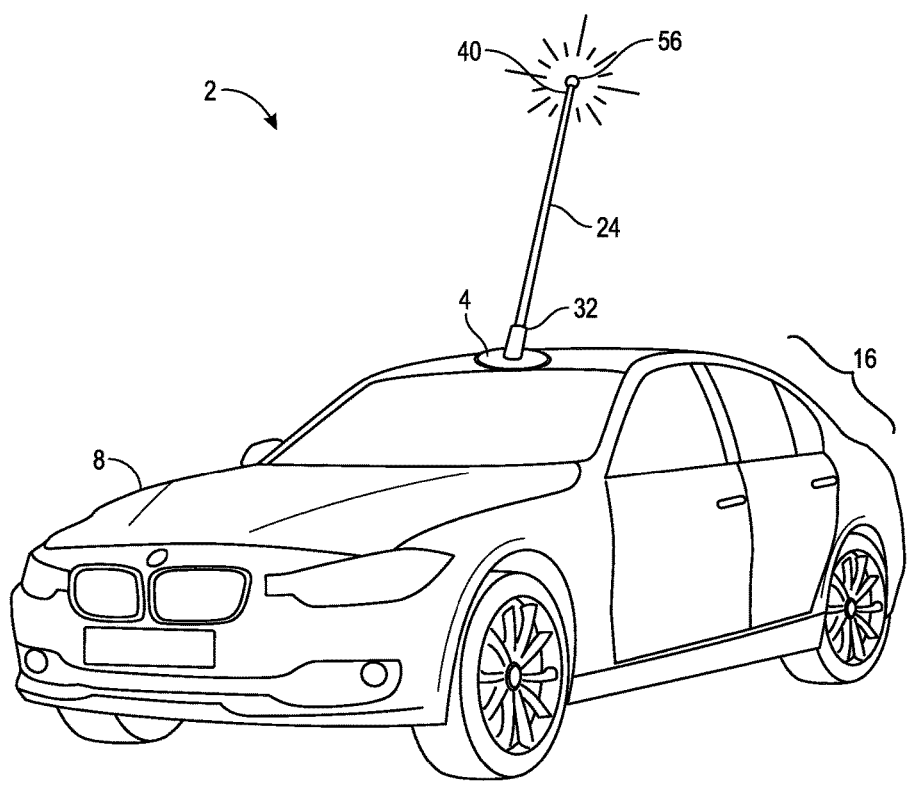
FIG. 1 illustrates a perspective view of an exterior identification device according to one exemplary embodiment having been attached to a vehicle.

The following examples are presented in a non-limiting manner.

It has been observed that vehicles being left outdoors are sometimes more difficult to track due to the presence of environmental factors. For example, the presence of ice and snow covering a vehicle impairs a person's ability to visually identify that vehicle. For example, where remotely readable devices, such as RFID tags are used, a layer of ice and/or snow covering the vehicle attenuates the wireless signals used for remotely reading the readable devices. It has been observed that when remotely readable devices are placed inside the vehicle or on the surface of the vehicle, the ability to remotely read the remotely readable devices is diminished due to the presence of environmental factors.

The expression "tracked premises" as herein refers to a defined area wherein a plurality of vehicles are stored. Vehicles may be moved within the area. New vehicles may be brought into the defined area while currently present vehicles may leave the area temporarily or permanently.

The term "on-site" as used herein in reference to a vehicle refers to the state of the vehicle being located within the tracked premises.

The expression "vehicle tracking operation" as used herein refers to actions being carried out to track the location of vehicles within the tracked premises. The vehicle tracking operation may also include tracking whether certain vehicles have left the tracked premises either temporarily or permanently.

The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "about" and "approximately" as used herein mean a reasonable amount of deviation of the modified term such that the end result is not significantly changed. These terms of degree should be construed as including a deviation of at least ±5% or at least ±10% of the modified term if this deviation would not negate the meaning of the word it modifies.

According to example kits disclosed herein, the kits further include an attachment member for selectively attaching the first tag member with the second tag member.

According to example kits disclosed herein, the first tag member comprises a first throughhole, the second tag member comprises a second throughhole, and the attachment member projects through the first throughhole and the second throughhole to attach together the first tag member and the second tag member.

According to example kits disclosed herein, the attachment member is a key ring.

According to example kits disclosed herein, the first throughhole is located proximate an edge of the first tag member and the first tag member is detachable from the attachment member by applying a pulling force on the first tag member to tear it from the attachment member.

According to example kits disclosed herein, the first tag member further comprises a cutaway portion for receiving the rearview mirror of the vehicle.

According to example kits disclosed herein, the cutaway portion defines a tapered portion extending from an edge of the first tag member and a spaced portion in communication with the tapered portion and having a width greater than a narrowest width of the tapered portion.

According to example kits disclosed herein, the first tag member is adapted to be adhered to a window and/or windshield of a vehicle.

According to example kits disclosed herein, the first tag member is substantially flexible.

According to example kits disclosed herein, the at least one first visual identifier comprises a first bar code displaying the unique identification code and the at least one second visual identifier comprises a second bar code displaying the unique identification code.

According to example kits disclosed herein, the at least one first visual identifier further comprises a visual number code displaying at least a portion of the unique identification code and the at least one second visual identifier comprises at least a portion of the unique identification code.

According to example kits disclosed herein, the first tag member and the second tag member are formed of a recyclable material.

According to example kits disclosed herein, the first tag member and the second tag member consist essentially of a recyclable material and said first and second passive RFID tags.

According to example kits disclosed herein, the first tag member and the second tag member consist essentially of a recyclable material, an ink and said first and second passive RFID tags.

According to example kits disclosed herein, the first tag member and the second tag member consist essentially of a recyclable material and said first and second passive RFID tags.

According to example kits disclosed herein, the first tag member and the second tag member consist essentially of paper and said first and second passive RFID tags.

According to example kits disclosed herein, the first tag member and the second tag member consist essentially of paper, ink and said first and second passive RFID tags.

According to example kits disclosed herein, the first tag member and the second tag member wherein said identification device consist essentially of cardboard and said first and second passive RFID tags.

According to example kits disclosed herein, the first tag member and the second tag member wherein said identification device consist essentially of cardboard, ink and the first and second passive RFID tags.

According to example methods and example systems disclosed herein, the vehicle tracking operation further associates a second remotely readable tag to the given unique identification code and the method/system further includes updating a current location of a key of the given vehicle if the second remotely readable tag associated to the given unique identification code is read by a second of the plurality of reading devices, the current location of the key being a location of the second reading device.

According to example methods and example systems disclosed herein, the method/system further includes transmitting at least one alert to a user device associated to the vehicle tracking operation, the alert providing access to information pertaining to the tracking operation.

According to example methods and example systems disclosed herein, a first of the at least one alert is transmitted upon initializing the vehicle tracking operation.

According to example methods and example systems disclosed herein, the vehicle tracking operation further defines at least one milestone location, and wherein if the current location of the given vehicle corresponds to one of the at least one milestone location, transmitting one of the at least one alert indicating the current location.

According to example methods and example systems disclosed herein, one of the at least one alert is transmitted upon completing the vehicle tracking operation.

According to example methods and example systems disclosed herein, receiving a new vehicle tracking request comprises receiving a vehicle identifier of the given vehicle and receiving the unique identification code.

According to example methods and example systems disclosed herein, the vehicle identifier is received from reading a first machine readable identifier provided on the given vehicle.

According to example methods and example systems disclosed herein, the machine readable identifier is a bar code provided on the given vehicle.

According to example methods and example systems disclosed herein, the unique identification code is received from reading a second machine readable visual identifier displaying the given unique identification code, the second machine readable visual identifier being displayed on the second remotely readable tag.

According to example methods and example systems disclosed herein, the second machine readable visual identifier is a bar code displayed on the second remotely readable tag.

According to example methods and example systems disclosed herein, the new vehicle tracking request is received as a result of scanning of a RFID of the first remotely readable tag.

According to example methods and example systems disclosed herein, the first remotely readable tag is physically coupled to the given vehicle at the time of the manufacturing of the vehicle.

According to example methods and example systems disclosed herein, the RFID is associated to a vehicle identifier of the given vehicle at the time of the manufacturing of the vehicle.

According to example methods and example systems disclosed herein, the first remotely readable tag is physically coupled to the given vehicle at the time of the sale of the vehicle at a dealership.

According to example methods and example systems disclosed herein, the RFID is associated to a vehicle identifier of the given vehicle at the time of the sale of the vehicle at the dealership.

According to example methods and example systems disclosed herein, the new vehicle tracking request is received as a result of the RFID being scanned when the given vehicle is initially driven up to one of the plurality of reading devices.

According to example identification devices and example kits disclosed herein, the pole member is releasably coupled to the base member.

According to example identification devices and example kits disclosed herein, the length of the pole member is of about 30 cm to about 90 cm.

According to example identification devices and example kits disclosed herein, the length of the pole member is of about 30 cm to about 60 cm.

According to example identification devices and example kits disclosed herein, when the base member is attached to the upper region of the vehicle, the identification tag is positioned at a height of about 30 cm to about 90 cm above the roof of the vehicle.

According to example identification devices and example kits disclosed herein, when the base member is attached to the upper region of the vehicle, the identification tag is positioned at a height of about 30 cm to about 60 cm above the roof of the vehicle.

According to example identification devices and example kits disclosed herein, the base member includes a suction cup.

According to example identification devices and example kits disclosed herein, the suction cup is releasably attachable to a windshield of the vehicle or to a roof of a vehicle.

According to example identification devices and example kits disclosed herein, the suction cup is adapted to maintain a binding with the windshield or to the roof of a vehicle at a temperature of less than −10 degrees Celsius.

According to example identification devices and example kits disclosed herein, the suction cup is adapted to maintain a binding with the windshield or the roof of a vehicle at a temperature of about −40 degrees Celsius to about 50 degrees Celsius.

According to example identification devices and example kits disclosed herein, the suction cup is releasably attachable to the roof of a vehicle.

According to example identification devices and example kits disclosed herein, wherein the base member comprises a clip adapted to be mounted over a top edge of a scrollable window of the vehicle.

According to example identification devices and example kits disclosed herein, the clip comprises a first leg and a second leg opposite the first leg and wherein the pole member extends from the first leg.

According to example identification devices and example kits disclosed herein, the clip is mounted to the scrollable window through a pinching of the clip between the scrollable window and a bottom side of a roof of the vehicle.

According to example identification devices and example kits disclosed herein, wherein the pole member is substantially flexible.

According to example identification devices and example kits disclosed herein, the pole member is resistant to temperatures below −10 degrees Celsius.

According to example identification devices and example kits disclosed herein, pole member is resistant to temperature of about −40 degrees Celsius to about 50 degrees Celsius.

According to example identification devices and example kits disclosed herein, the devices/kits further included a light connected thereto.

According to example identification devices and example kits disclosed herein, the pole member is connected to said base member at a first end and said light is connected to said pole member at a second end.

According to example identification devices and example kits disclosed herein, the devices/kits further include a receiver in signal communication with the light, the receiver being associated to a unique identification code and being configured to illuminate the light when a signal corresponding to the unique identification code is received thereat.

According to example identification devices and example kits disclosed herein, the identification tag is an RFID tag being associated to a unique identification code and the light is configured to be illuminated when the RFID tag is queried by a signal corresponding to the unique identification code.

According to example methods disclosed herein, the remotely readable tag is positioned at a height of at least 15 centimeters above the upper region of the vehicle.

According to example methods disclosed herein, the remotely readable tag is positioned at a height of at least 30 centimeters above the upper region of the vehicle.

According to example methods disclosed herein, the remotely readable tag is positioned at a height of about 30 centimeters to about 90 centimeters above the upper region of the vehicle.

According to example methods disclosed herein, the remotely readable tag is positioned at a height of about 30 centimeters to about 60 centimeters above the upper region of the vehicle.

According to example methods disclosed herein, the upper region comprises one or more of a hood, side mirror, front windshield, rear windshield, side windows, roof and truck door of the vehicle.

According to example methods disclosed herein, the base member includes a suction cup, the method further includes adhering a suction cup to a windshield of the vehicle.

According to example methods disclosed herein, the base member includes a suction cup, the method further includes adhering a suction cup to a roof of the vehicle.

According to example methods disclosed herein, the base member includes a clip, the method further includes scrolling down a side window of the vehicle, mounting the clip over a top edge of the side window, and scrolling up the side window to pinch the clip between a top edge of the window and an inner surface of a roof of the vehicle.

According to example methods disclosed herein, the method further includes positioning the remotely readable tag to the distal end of the pole member.

According to example methods disclosed herein, the method further includes attaching a light to the pole member, the light being configured to be illuminated when a receiver in signal communication with the light receives a signal corresponding to a unique identification code associated to the receiver.

According to example methods disclosed herein, the method further includes attaching a light to the pole member, the light being configured to be illuminated when the identification tag in signal communication with the light is queried by a signal corresponding to a unique identification code associated to the receiver.

According to example methods disclosed herein, the light is attached to a distal end of the pole member.

According to example methods and example systems disclosed herein, the method/system further includes setting the absence permission for the given unique identification code to temporarily allowed for a predetermined amount of time in response to receiving an event command, reading at one of the at least one boundary reading devices a first instance of the remotely readable tag associated to the given unique identification code, in response to the reading of the first instance, trigger a timer associated to the given unique identifier, transmitting an alert if the timer exceeds the predetermined amount of time.

According to example methods and example systems disclosed herein, the method/system further includes reading at one of the at least one boundary reading devices a second instance of the remotely readable tag associated to the given unique identifier and in response to the reading of the second instance, terminating the timer.

According to example methods and example systems disclosed herein, in response to the reading of the second instance, setting the absence permission for the given unique identification code to disallowed.

According to example methods and example systems disclosed herein, the event command comprises an event type and wherein the predetermined amount of time of the timer is selected based on the event type.

According to example methods and example systems disclosed herein, the event type is chosen from a client test drive, a maintenance test drive, an off-site servicing, and a courtesy rental.

According to example identification device disclosed herein, the first tag member, the second tag member, and the third tag member are disposable.

According to example identification device disclosed herein, the first tag member, the second tag member, and the third tag member are recyclable.

According to example identification device disclosed herein, the third tag member is free of an RFID tag.

According to example identification device disclosed herein, the second tag member is tearable from first tag member.

According to example identification device disclosed herein, the third tag member is tearable from the first tag member.

According to example identification device disclosed herein, said identification device is made of a recyclable material.

According to example identification device disclosed herein, said identification device consists essentially of a recyclable material and said first and second passive RFID tags.

According to example identification device disclosed herein, said identification device consists essentially of a recyclable material, an ink and said first and second passive RFID tags.

According to example identification device disclosed herein, said identification device consists essentially of a recyclable material and said first and second passive RFID tags.

According to example identification device disclosed herein, said identification device consists essentially of paper and said first and second passive RFID tags.

According to example identification device disclosed herein, said identification device consists essentially of paper, ink and said first and second passive RFID tags.

According to example identification device disclosed herein, said identification device consists essentially of cardboard and said first and second passive RFID tags.

According to example identification device disclosed herein, said identification device consists essentially of cardboard, ink and the first and second passive RFID tags.

Referring now to FIG. 1, therein illustrated is perspective view of an exterior identification device 2 according to a first exemplary embodiment having been attached to a vehicle 8. The identification 2 includes a base member 4 adapted to be attached to an upper region 16 of the vehicle 8.

The upper region 16 of the vehicle 8 as used herein refers to a region proximate a roof of the vehicle. For example, in a road passenger vehicle, the upper region 16 may include the hood, the side mirrors, the front windshield, the rear windshield, the side windows, the roof, and the trunk door of the vehicle.

The exterior identification device 2 further includes a pole member 24 adapted to extend from the base member 4. For example, the pole member 24 may be any elongated member having a first end 32 and a second end 40.

According to one exemplary embodiment, the pole member 24 has a minimum length of about 15 centimeters.

According to one exemplary embodiment, the pole member 24 has a minimum length of about 30 centimeters to about 60 centimeters.

According to one exemplary embodiment, the pole member 24 has a length of about 30 cm to about 60 cm.

According to one exemplary embodiment, the pole member 24 has an adjustable length, such as being telescoping, wherein the full extended length of the pole member 24 is of about 30 centimeters to about 90 centimeters. For example, the full extended length of the pole member 24 is of about 30 centimeters to about 60 centimeters.

For example, the pole member 24 may be formed of a substantially flexible material, such as a soft plastic. For example, the pole member 24 may be formed of a substantially durable material that resists breaking in winds having a velocity greater than 50 kilometers per hour. For example, the pole member 24 may be formed of a substantially temperature resistant material that retains its flexible and durable properties in temperatures of below −10 degrees Celsius. For example, the pole member 24 is substantially flexible and durable in temperatures in of about −40 degrees Celsius to about 50 degrees Celsius.

According to various exemplary embodiments, the pole member 24 is releasably coupled at its first end 32 to the base member 4. For example, the pole member 24 and the base member 4 are coupled when used in a tracking operation. The pole member 24 and the base member 4 can then be uncoupled for easier storage when not being used. For example, the first end 32 may be a proximal end of the pole member 24.

According to various exemplary embodiments, the pole member 24 is permanently attached to the base member 4. For example, the pole member 24 and the base member 4 may be integrally formed, such as being molded.

The base member 4 is releasably attachable to the upper region of the vehicle such that when the pole member 24 is further coupled thereto, the pole member 24 has a substantially upright position with the vehicle 8. For example, as illustrated in FIG. 1, the pole member 24 is substantially vertical. Accordingly, when so attached, the second end 40 is positioned at a height of at least 15 centimeters above a top surface of the upper region 16 of the vehicle 8. For example, the second end 40 of the pole member 24 is positioned at about 30 centimeters to about 90 centimeters above the top surface of the upper region 16 of the vehicle. For example, the second end 40 of the pole member 24 is positioned at about 30 centimeters to about 60 centimeters above the top surface of the upper region 16 of the vehicle. For example, the second end 40 may be a distal end of the pole member 24.

According to one exemplary embodiment, the base member 4 includes a suction cup for releasable attachment to the upper region of the vehicle 8 by negative fluid pressure. For example, the suction cup can be attached to a non-porous surface of the vehicle 8, such as the front, side or rear windshield of the vehicle 8. For example, the suction cup can be attached to the roof of the vehicle 8. For example, the size of the suction cup is chosen so that the suction cup of the base member 4 can maintain an attachment with the windshield of the vehicle 8 at temperatures of below −10 degrees Celsius. For example, the suction cup can maintain an attachment with the windshield of the vehicle 8 at temperatures of about −40 degrees Celsius to about 50 degrees Celsius.

Figure 2:
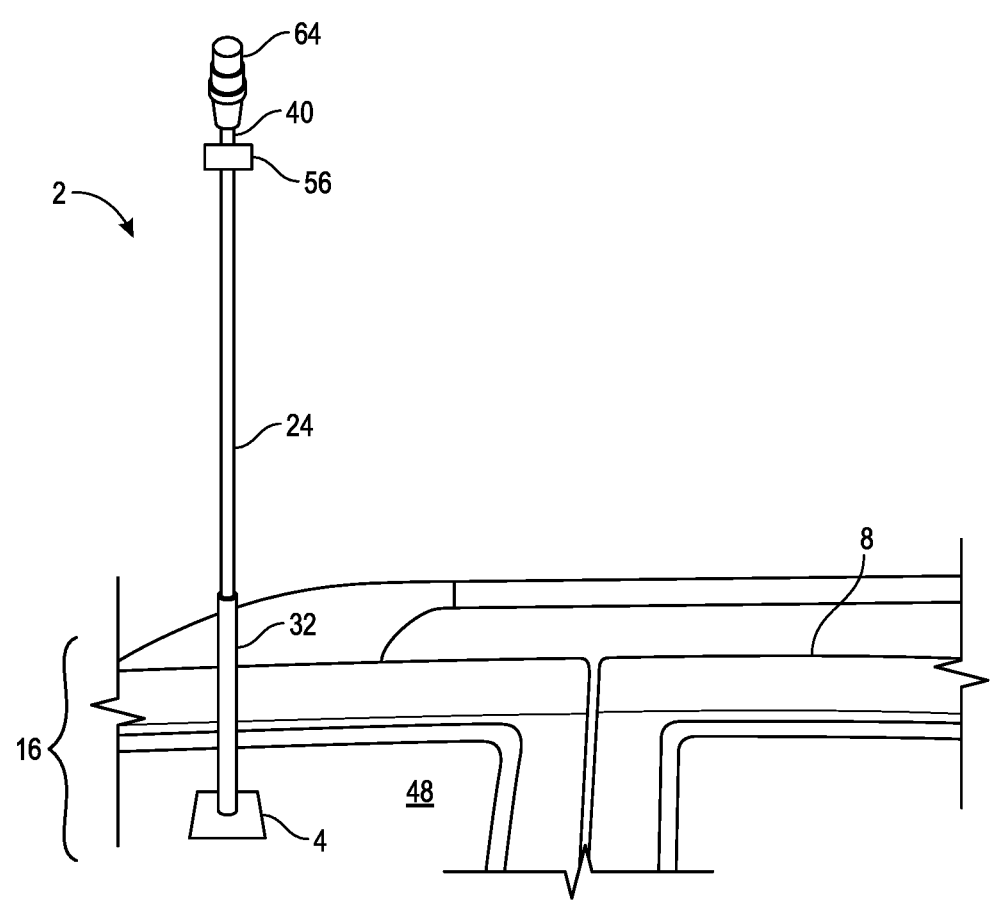
FIG. 2 illustrates a side elevation view of the exterior identification device according to an alternative exemplary embodiment having been attached to a vehicle.

Referring now to FIG. 2, therein illustrated is a side elevation view of the exterior identification device 2 according to an exemplary alternative embodiment. According to the exemplary alternative embodiment, the base member 4 of the exterior identification device 2 includes a clip adapted to be mounted over a top edge of a scrollable window 48 of the vehicle 8. For example, the clip can be mounted to the scrollable window through pinching of the clip between a top edge of the scrollable window and a bottom surface of a roof of the vehicle 8. For example, the clip includes a first leg and a second leg opposite the first leg. When mounted onto the scrollable window, the pole member 4 extends from the first leg, which is positioned outside of the vehicle 8, while the second leg is positioned inside the vehicle.

Referring back to FIGS. 1 and 2, the exterior identification device 2 according to the exemplary embodiment or the alternative embodiment further includes an identification tag 56 adapted to be read wirelessly and remotely. The identification tag 56 is positioned on the pole member 24 at a predetermined distance from the base member 4. For example, the identification tag 56 is located at the second end 40 of pole member 24.

Accordingly, the identification tag 56 is located at a predetermined distance from the base member 4 that substantially corresponds to a length of the pole member 24.

For example, the identification tag 56 is a radio frequency identification (RFID) tag. For example, the identification tag 56 is a passive RFID tag. For example, the RFID tag is associated to a unique identification code. For example, when attached to a given vehicle 8, the identification tag 56 may be remotely read at various locations on-site to track the location of the given vehicle 8 according to various known methods of vehicle tracking. For example, the identification code is unique in that no other entry within a vehicle tracking operation and system has the same identification code at the same time.

It will be understood that when the pole member 24 is coupled to the base member 4 and the base member 4 is further attached to the upper region 16 of the vehicle 8, the identification tag 56 is positioned at a height above the upper region 16 of the vehicle 8 corresponding to the length of the pole member 24. For example, the identification tag 56 will be positioned at a height of about 15 centimeters above the upper region of the vehicle 8. For example, the identification tag 56 will be positioned at a height of between about 30 centimeters and about 60 centimeters above the upper region 16 of the vehicle.

It will be appreciated that positioning the identification tag 56 at a predetermined distance from the base member 4, such as at the second end 40 of the pole member 24, causes the identification tag 56 to be positioned above and away from an outer surface of the vehicle 24. Accordingly, the predetermined distance of the positioning of the identification tag 56 away from the base member 4 is chosen so that the identification tag 56 is positioned above and away from snow or ice that may accumulate on the outer surface of the vehicle 24 in geographical locations having colder climates. Unlike an identification tag being positioned inside or on the surface of a vehicle 8, the identification tag 56 of the exemplary exterior identification device 2 can be positioned so as to not be affected, or affected to a lesser degree, by snow and/or ice accumulated on the vehicle 24.

According to various exemplary embodiments, including exemplary embodiments illustrated in FIGS. 1 and 2, the exterior identification device 2 further includes a light 64 connected thereto. For example, the light 64 is positioned along the length of the pole member 24. For example, the light 64 is positioned at the second end 40 of the pole member 24. For example, the light 64 is a strobe light. For example, the light 64 may be powered by a battery mounted to the pole member 24 or base member 4 of the exterior identification device 2.

According to one exemplary embodiment, the exterior identification device 2 further includes a receiver in signal communication with the light 64. The receiver is associated to a unique identification code and is configured to transmit a signal to illuminate the light in response to receiving a signal corresponding to the unique identification code.

According to one exemplary embodiment, the light 64 is in signal communication with the identification tag 56 and is configured to be illuminated when the identification tag 56 is queried by a wireless signal corresponding to the unique identification code associated to the identification tag 56.

For example, the light 64 may be used to assist in visual identification of the vehicle 8. For example, a user seeking to locate a given vehicle 8 within a parking lot having a plurality of vehicles may transmit a querying signal associated a unique identification code using a suitable device. The querying signal is either received at the receiver of the identification device and/or to power the identification tag 56. In response to receiving the querying signal and/or being powered by it, a light 64 linked to an identification tag 56 having the same unique identification code is illuminated. The user can then visually identify the light 64 of the exterior identification device 2 attached to the given vehicle 8 to further quickly determine the physical position of the given vehicle 8.

Figure 3:
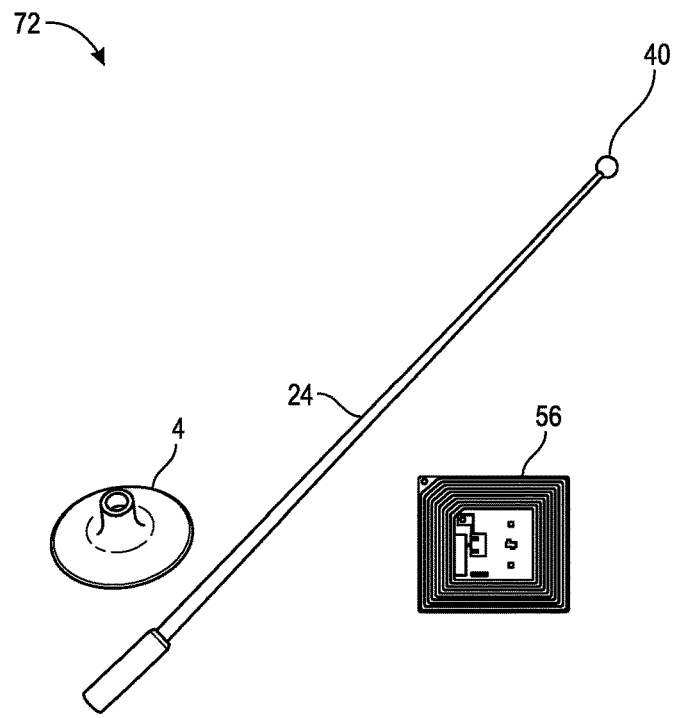
FIG. 3 illustrates a plan view of a kit for forming an exterior identification device according to one exemplary embodiment.

According to various exemplary embodiments, and as illustrated in FIG. 3, the components of the exterior identification device 2 can be provided as a kit 72. For example, the kit 72 includes the base member 4, the pole member 24, and the identification tag 56. The base member is adapted to be releasably attached to an upper region of a vehicle. The pole member 24 is adapted to be releasably coupled at a first end to the base member 4. The identification tag 56 is further adapted to be mounted on the pole member and at a predetermined distance from the first end 32. For example, the identification tag 56 is adapted to be mounted at the second end 40 of the pole member 24 at a distance away from the first end corresponding to the length of the pole member 24.

According to various exemplary embodiments of a method for mounting a remotely readable tag, the base member 4 is securely attached to the upper region 16 of the vehicle 8.

According to various exemplary embodiments where the base member 4 and the pole member 24 are provided as discrete members, the pole member 24 is further coupled at its proximal end 32 to the base member 4. For example, the pole member 24 and the base member 4 may be coupled together either before or after attaching the base member 4 to the upper region 16 of the vehicle 8.

When attaching the base member 4, the pole member 24 is positioned to a substantially upright position whereby the identification tag 56 positioned on the pole member 24 is further positioned at a predetermined height above the top surface of the upper region 16 of the vehicle 8. For example, the pole member 24 is positioned so that the identification tag 56 is positioned at a height of at least 15 centimeters above the top surface of the upper region 16 of the vehicle 8. For example, the pole member 24 is positioned so that the identification tag 56 is positioned at a height of about 30 centimeters to about 90 centimeters above the top surface of the upper region 16 of the vehicle 8. For example, the pole member 24 is positioned so that the identification tag 56 is positioned at a height of about 30 centimeters to about 60 centimeters above the top surface of the upper region 16 of the vehicle 8.

According to various exemplary embodiments where the base member 4 includes a suction cup, the exemplary method includes attaching the suction cup to a suitable surface of the upper region 16 of the vehicle. For example, the suction cup is attached to a non-porous surface, such as a front, side or rear windshield. For example, the suction cup can be attached to the roof of the vehicle 8. In doing so, the pole member 24 should still be positioned in a substantially upright position to further position the identification tag 56 at a predetermined height above the top surface of the upper region 16 of the vehicle 8.

According to various exemplary embodiments where the base member 4 includes a clip mountable over a top edge of a scrollable window 48 of the vehicle 8, the exemplary method includes scrolling down the scrollable window 48, positioning the clip over a top edge of the scrolled-down window 48 and further scrolling up the scrollable window 48 to pinch the clip between the top edge and the inner surface of the roof. In doing so, the pole member 24 should still be positioned in a substantially upright position to further position the identification tag 56 at a predetermined height above the top surface of the upper region 16 of the vehicle 8.

For example, where the base member 4, the pole member 24 and the identification tag 56 are provided as a kit, the exemplary method further includes attaching the identification tag 56 to the distal end 40 of the pole member 24. The identification tag 56 may be attached before or after attaching pole member 24 to the base member 4. The identification tag 56 may be attached before or after attaching the base member 4 to the upper region 16 of the vehicle 8.

According to various exemplary embodiments, the exemplary method further includes attaching a light 64 to the pole member 24. The light 64 is attached along the length of the pole member 24 at a predetermined distance from the first end 32 of the pole member 24. For example, the predetermined distance corresponds to a thickness of snow and/or ice that may accumulate on the surface of the upper region 16 of the vehicle. For example, the light 64 is attached to the second end 40 of the pole member 24. The method may further include configuring the light so as to be illuminated when a receiver connected to the light 64 receives a signal corresponding to a unique identification code associated to the receiver. Alternatively, the light 64 may be connected to the identification tag 56 so as to be illuminated when the identification tag 56 is queried by a signal corresponding to a unique identification code associated to the identification tag 56.

It has been observed that tracking both the stock of vehicles on-site and their respective paired keys present various challenges when there are a large number of vehicles on-site or where the inventory of vehicles is constantly changing. For example, in a maintenance garage, a given vehicle must be moved between various maintenance stations, which require multiple uses of the key paired to the given vehicle. The given vehicle may be serviced by multiple technicians at the same time. Furthermore, a maintenance technician may be servicing multiple vehicles simultaneously. There is therefore a heightened possibility of misplacing keys of one or more vehicles.

Figure 4A:
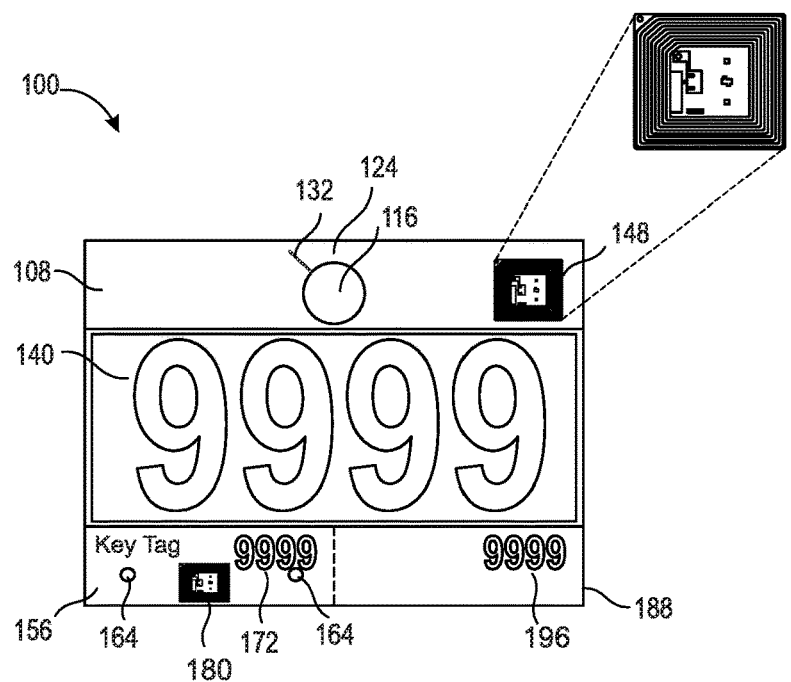
FIG. 4A illustrates a plan view of an interior identification device according to one exemplary embodiment.

Referring now to FIG. 4A, therein illustrated is a plan view of an interior identification device 100 according to one exemplary embodiment. The interior identification device 100 includes a first tag member 108. The first tag member 108 may be for mounting onto a rearview mirror of a road passenger vehicle. For example, the first tag member 108 includes a cutaway portion 116 defined in part by a hook portion 124 and a cut 132. A neck of a rearview mirror may be inserted via the cut 132 into the cutaway portion 116 and the first tag member 108 may be hung from the neck of the rearview mirror while being supported by the hook portion 124. Alternatively, the first tag member 108 may have an adhesive portion, and the first tag member may be adhered to a window and/or windshield of the vehicle or to a rearview mirror of the vehicle.

The first tag member 108 further has formed thereon a first visual identifier 140 displaying a unique identification code. For example, the unique identification code "9999" is illustrated. For example, the identification code is unique in that no other entry within a vehicle tracking operation and system has the same identification code at the same time.

The first tag member 108 further has coupled thereto a first passive RFID tag 148 that is associated to the unique identification code.

The interior identification device 100 further includes a second tag member 156 that is detachably coupled to the first tag member 108. The second tag member 156 is adapted to be mounted onto a key of a vehicle. For example, the second tag member 156 includes one or more throughholes 164 for passing therethrough a loop of a keychain.

The second tag member 156 also has formed thereon a second visual identifier 172 displaying the unique identification code. For example, as illustrated, the unique identification code "9999" is also displayed on the second tag member 156.

The second tag member 156 further has coupled thereto a second passive RFID tag 180 that is associated to the same unique identification code as the first passive RFID tag 148.

The interior identification device 100 further includes a third tag member 188 that is detachably coupled to the first tag member 108. The third tag member 188 also has formed thereon a third visual identifier 196 displaying the unique identification code. For example, the third tag member 188 is free of (i.e. does not include) a RFID tag.

The interior identification device 100 is manufactured as a single continuous body. For example, the interior identification device 100 is formed of an easily disposable material. For example, the interior identification device 100 is substantially formed of a recyclable material, such as paper or cardboard. When manufactured, perforated lines are formed on the single continuous body of the interior identification device 100 to define the first tag member 156 and the detachable second and third tag members 156, 188. For example, the second tag member 156 and the third tag member 188 can be torn from the first tag member 108.

For example, the identification device can consist essentially of a recyclable material and the first and second passive RFID tags.

For example, the identification device can consist essentially of a recyclable material, an ink and the first and second passive RFID tags.

For example, the identification device can consist essentially of paper or cardboard and the first and second passive RFID tags.

For example, the identification device can consist essentially of paper or cardboard, ink and the first and second passive RFID tags.

By having the first, second and third tag members 108, 156, and 188 form a single continuous body, a tracking entry for a given vehicle can be easily created within an automated vehicle tracking operation and system. For example, when a customer brings his or her vehicle to be serviced, the interior identification device 100 can be readily provided to be used in tracking the vehicle during service. For example, the unique identification code of the interior identification device 100 can be associated with a unique identifier of the vehicle (ex: license plate number, vehicle identification number (VIN), etc.) within the automated vehicle tracking operation and system. The second tag member 156 can then be detached from the first member 108 and attached to the key of the vehicle to be serviced. The third tag member 156 can then be attached from the first member 108 and given to the customer. The third tag member 188 may represent a claim check for the customer. Accordingly, an RFID tag is not provided on the third tag member 188 as tracking of the third tag member 188 is not necessary.

When the second tag member 156 and the third tag member 188 are torn from the first tag member 108, the first tag member 108 forms a single continuous physical element that includes the first visual identifier 140 and the first RFID tag 148. Accordingly, the first tag member 108 provides within a single physical element the means to both visually identify and wirelessly remotely identify a vehicle that has the first tag member 108 placed therein. Similarly, the second tag member 156 also provides within a single physical element the means to both visually identify and wirelessly remotely identify keys of the vehicle having the first tag member 108 placed therein.

Figure 4B:
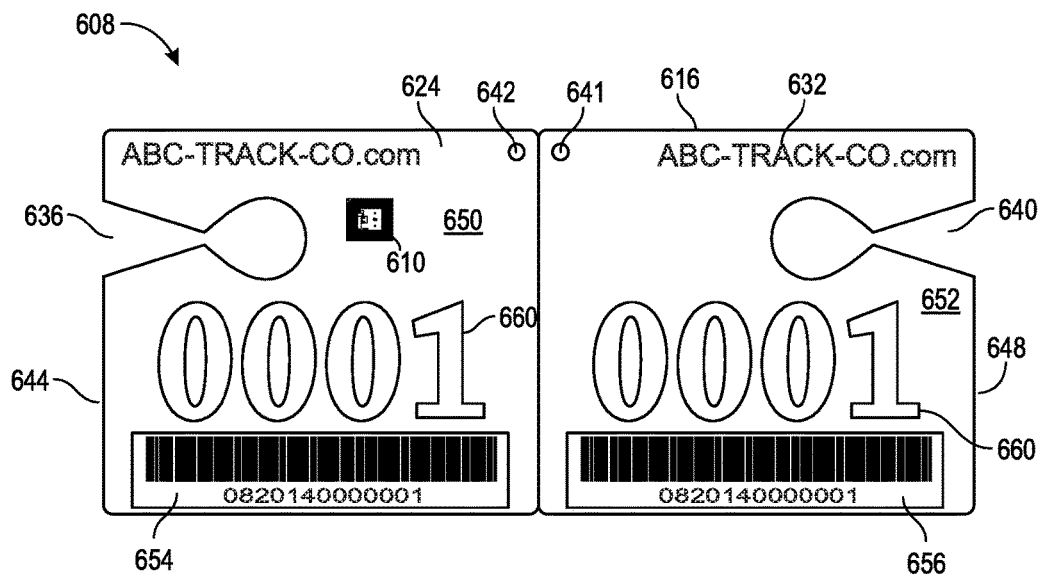
FIG. 4B illustrates a plan view of an unassembled first tag member of an identification kit according to one exemplary embodiment.

Referring now to FIG. 4B, therein illustrated is a plan view of an unassembled first tag member 608 according to one exemplary embodiment of an identification kit. The first tag member 608 is adapted to be mounted onto a rearview mirror of a road passenger vehicle. The unassembled first tag member 608 includes a body portion 616 having a first side portion 624 and a second side portion 632. The first side portion 624 defines a first cutaway 636 and the second side portion 632 defines a second cutaway 640. The first side portion may further define a first throughhole 641. Similarly, the second side portion may further define a second throughhole 642.

The first cutaway 636 may include a tapered portion having a gradually narrowing width extending from an edge 644 of the first side portion 624. The tapered portion may further extend into a spaced portion having a width greater than the narrowest width of the tapered portion. Similarly, the second cutaway 640 may also include a tapered portion having a gradually narrowing width extending from an edge 648 of the second side portion 632. The tapered portion of the second side portion 632 may also extend into a spaced portion having a width greater than the narrowest width of the tapered portion.

The first tag member 608 may be assembled by folding the first side portion 624 against the second side portion 632 so that the cutaway portions 636 and 640 are aligned. Similarly, the first throughhole 641 and the second throughhole 642 are aligned.

When assembled, aligned cutaway portions 636, 640 form a single cutaway. A neck of a review mirror of the vehicle may be inserted into the cutaway so as to hang the first tag member 608 from the rearview mirror.

Also when assembled, aligned first throughhole 641 and second throughhole 642 form a single throughhole. The single throughhole can receive an attachment member.

At least one of an outer face 650 of the first side portion 624 and an outer face 652 of the second side portion 632 has formed thereon at least one visual identifier displaying a unique identification code. For example, and as illustrated, the outer face 650 has a first visual identifier 654 and the outer face 652 has a second visual identifier 656. Both visual identifiers 654 and 656 are the same and display the same unique identification code. For example, the visual identifier is a machine readable identifier, such as bar code. The bar code may be a three dimensional bar code. The visual identifier may encode the unique identification code. For example, and as illustrated, the bar codes 654, 656 each encode the value "0820140000001".

At least one of an outer face 650 of the first side portion 624 and an outer face 652 of the second side portion 632 further has formed thereon another visual identifier 660 that is a visual human-identifiable code. The visual human-identifiable code refers to a code that may be readily identified by a human user, such as an Arabic number, Roman numerals, alpha-numeric code, or other number or character system identifiable to a human. The human-identifiable code may include at least a portion of the unique identification code. For example, the human identifiable visual identifier 660 displays Arabic numbers "0001" corresponding to the last 4 digits of the unique identification code.

The first tag member 608 further includes a RFID tag 610. The RFID tag 610 may be a passive RFID tag 610. The RFID tag 610 allows the first tag member 608 to be remotely read by a suitable RFID reader. For example, the RFID tag 610 may be coupled to one of an inner face of the first side portion 624 and an inner face of the second side portion 632. Accordingly, when the first tag member 608 is assembled, the RFID tag 610 is disposed between the first side portion 624 and the second side portion 632.

According to various exemplary embodiments, the RFID tag 610 may be associated to the unique identification code. The RFID tag 610 may be preprogramed to have the same value as the unique identification code of the first tag member 608.

According to other exemplary embodiments, the RFID tag 610 may be writable.

According to yet other exemplary embodiments, the RFID tag 610 may be preprogrammed with a value that is different from the unique identification code. Accordingly, the RFID value may be associated with the displayed unique identification code within a vehicle tracking system 208 during a vehicle tracking operation, as described elsewhere herein.

For example, the first tag member 608 is substantially flexible to allow flexing to receive the neck of a review mirror within its cutaway.

For example, the first tag member 608 is formed of a tearable material to permit tearing of a portion of the first tag member 608. Accordingly, the first tag member 608 may be detached from an attachment member received in its throughhole by applying a pulling force on the first tag member 608 to tear it from the attachment member.

For example, the first tag member 608 can consist essentially of a recyclable material and its RFID tag.

For example, the first tag member 608 can consist essentially of a recyclable material, an ink and its RFID tag.

For example, the first tag member 608 can consist essentially of paper or cardboard and its RFID tag.

For example, the first tag member 608 can consist essentially of paper or cardboard, ink and its RFID tag.

Figure 4C:
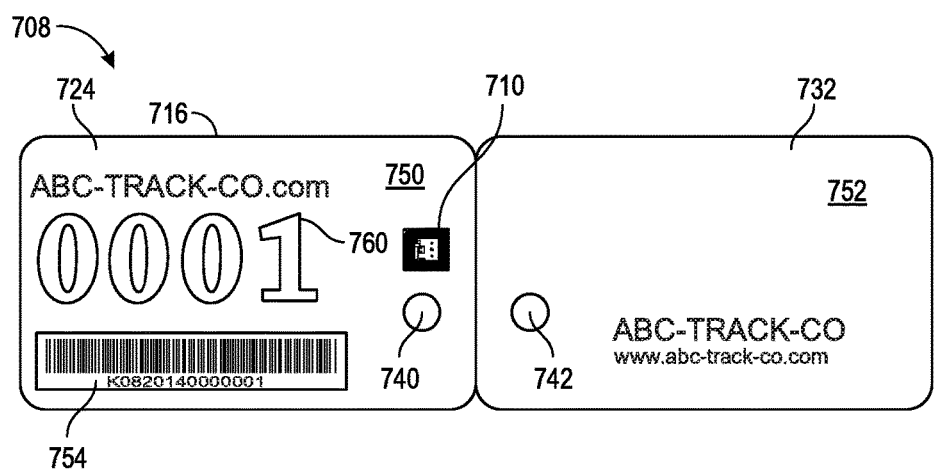
FIG. 4C illustrates a plan view of an unassembled second tag member of an identification kit according to one exemplary embodiment.

Referring now to FIG. 4C, therein illustrated is a plan view of an unassembled second tag member 708 according to one exemplary embodiment of an identification kit. The second tag member 708 is adapted to be attached to a key of a vehicle. The unassembled second tag member 708 includes a body portion 716 having a first side portion 724 and a second side portion 732. The first side portion 724 defines a first throughhole 741. Similarly, the second side portion may further define a second throughhole 742.

The second tag member 708 may be assembled by folding the second side portion 724 against the second side portion 732. For example, assembly of the second tag member 708 causes the first through 741 and the second throughhole 742 to be aligned, thereby forming a single throughhole.

At least one of an outer face 750 of the first side portion 724 and an outer face 752 of a second side portion 732 has formed thereon at least one visual identifier 754 displaying a unique identification code. For example, the visual identifier is a machine readable identifier, such as a bar code. The bar code may be a three-dimensional bar code. The visual identifier may encode the unique identification code. When provided within a single identification kit, the unique identification code of the second tag member 708 may have a correspondence to the unique identification code of the first tag member 608. However, the first visual identifier may be different from the second identifier. For example, and as illustrated, the bar code 754 also encodes the value "0820140000001", but further includes the character "k" to denote that the unique identification code is for the second tag member 708.

At least one of an outer face 750 of the first side portion 724 and an outer face 752 of the second side portion 732 further has formed thereon another visual identifier 760 that is a visual human-identifiable code. The visual human-identifiable code refers to a code that may be readily identified by a human user, such as an Arabic number, Roman numerals, alpha-numeric code, or other number or character system identifiable to a human. The human-identifiable code may include at least a portion of the unique identification code. For example, the human-identifiable visual identifier 760 displays Arabic numbers "0001" corresponding to the last 4 digits of the unique identification code and also corresponding to the visual identifier 660 of the first tag member 608.

The second tag member 708 further includes a RFID tag 710. The RFID tag 710 may be a passive RFID tag. The RFID tag 710 allows the second tag member 708 to be remotely read by a suitable RFID reader. For example, the RFID tag 710 may be coupled to one of an inner face of the first side portion 724 and an inner face of the second side portion 732. Accordingly, when the second tag member 708 is assembled, the RFID tag 710 is disposed between the first side portion 724 and the second side portion 732.

According to various exemplary embodiments, the RFID tag of the second tag member 708 may be preprogramed to have the same value as the unique identification code of the second tag member 708.

According to other exemplary embodiments, the RFID tag 710 may be writable.

According to yet other exemplary embodiments, the RFID tag 710 may be preprogrammed with a value that is different from the unique identification code. Accordingly, the RFID value may be associated with the displayed unique identification code within a vehicle tracking system 208 during a vehicle tracking operation, as described elsewhere herein.

For example, the second tag member 708 can consist essentially of a recyclable material and its RFID tag.

For example, the second tag member 708 can consist essentially of a recyclable material, an ink and its RFID tag.

For example, the second tag member 708 can consist essentially of paper or cardboard and its RFID tag.

For example, the second tag member 708 can consist essentially of paper or cardboard, ink and its RFID tag.

According to various exemplary embodiments, the assembled second tag member 708 is substantially smaller than the first tag member 608. The first tag member 608 being larger allows it to be appropriately coupled to the rearview mirror of a vehicle. Furthermore, larger sized visual identifier 654, 656 and second visual identifier 660 allows the identifier to be read from a larger distance. By contrast, the second tag member 708 being smaller allows it to be easily transported. The second tag member 708 is intended to be attached to the key of a vehicle and its small size promotes carrying with the key.

Figure 4D:
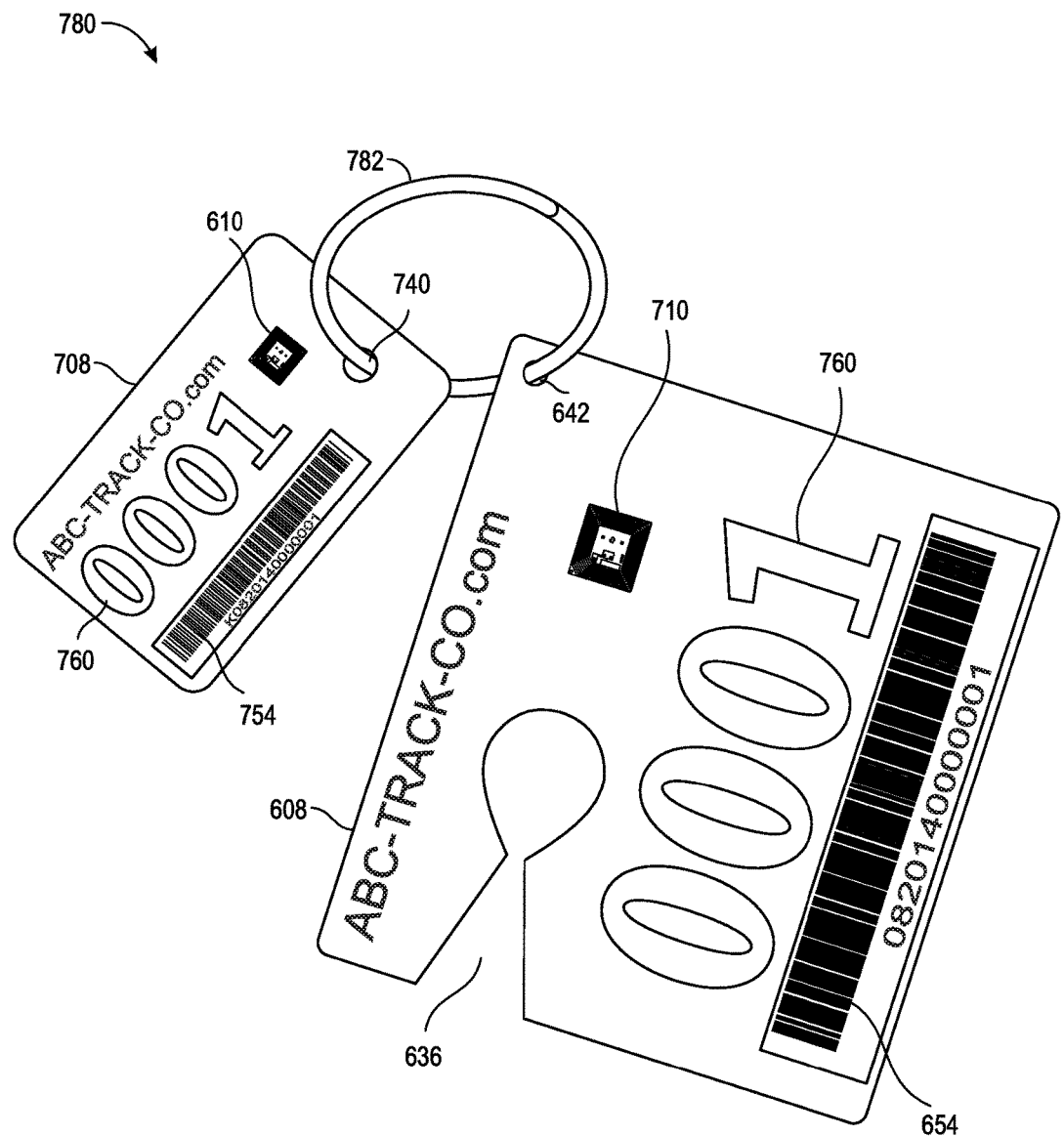
FIG. 4D illustrates a plan view of the exemplary kit according to one exemplary embodiment.

Referring now to FIG. 4D, therein illustrated is a plan view of an identification kit 780. The identification kit 780 includes at least the first tag member 608 and the second tag member 708. As illustrated, the first tag member 608 and second tag member 708 may be attached together. However, it will be understood that the first tag member 608 and the second tag member 708 may be provided separately.

For example, and as further illustrated, the first tag member 608 and the second tag member 708 are attached using an attachment member 782. As illustrated, the attachment member 782 attaches the first tag member 608 and the second tag member 708 through their respective throughholes. The attachment member 782 may be a keychain ring but may be any other suitable member for attaching the second tag member 708 to the key of a vehicle.

When used, the first attachment member 782 may be torn from the attachment member 782 and coupled to a rearview mirror a vehicle to be tracked. The attachment member 782 is then attached to the keys for that vehicle, thereby attaching the second tag member 708 to the key.

Figure 5:
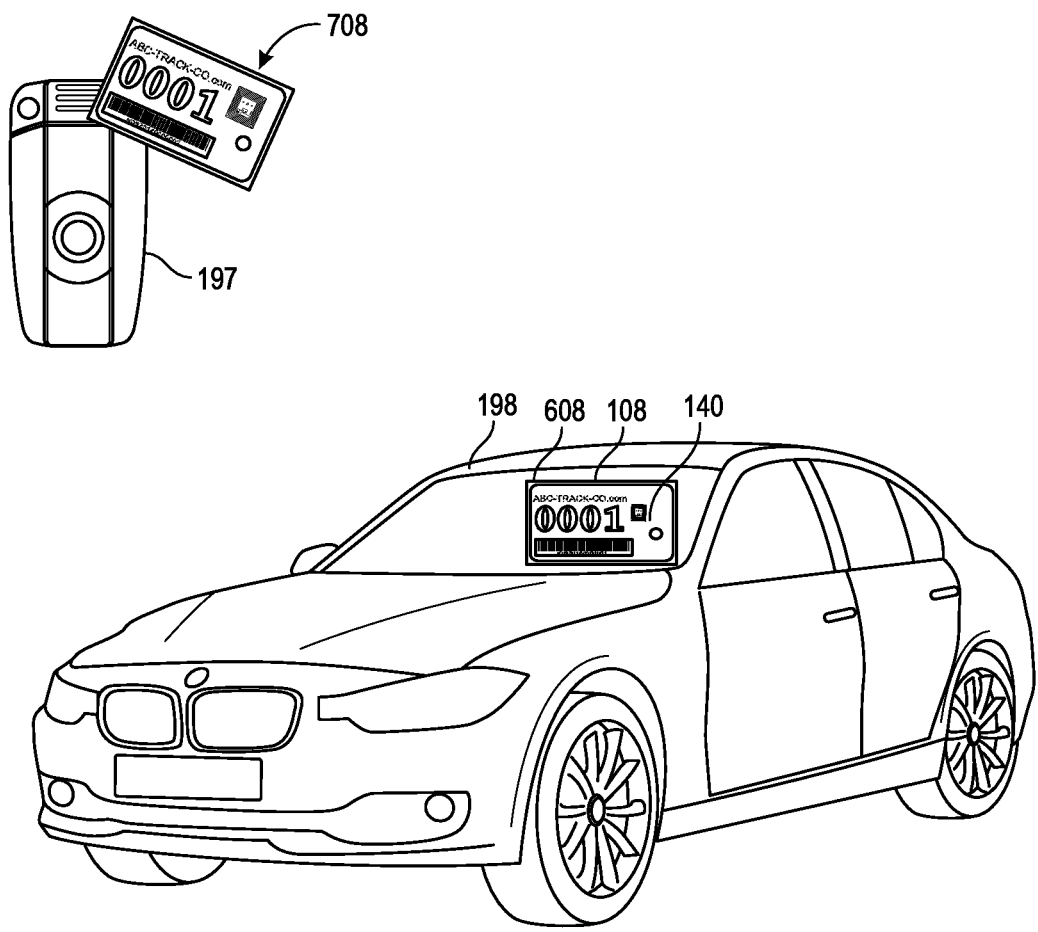
FIG. 5 illustrates a schematic diagram of a first tag member and a second tag member of the interior identification device in use.

For example, FIG. 5 illustrates a schematic diagram showing the second tag member 708 being attached to a vehicle key 197 and the first tag member 608 being mounted onto the rear view mirror of a vehicle 198.

It has been observed that the possibility of vehicles temporarily leaving the tracked premises requires tracking not of only vehicles on-site but also when the vehicles are being brought temporarily off-site. For example, improper tracking creates risks of tampering, such as theft of vehicles.

It has also been observed that the high number of vehicles on site and the high number of keys may cause misplacement of keys. This may especially the case where vehicles of the same make or model are present and the keys of these vehicles closely resemble one another.

Figure 6:
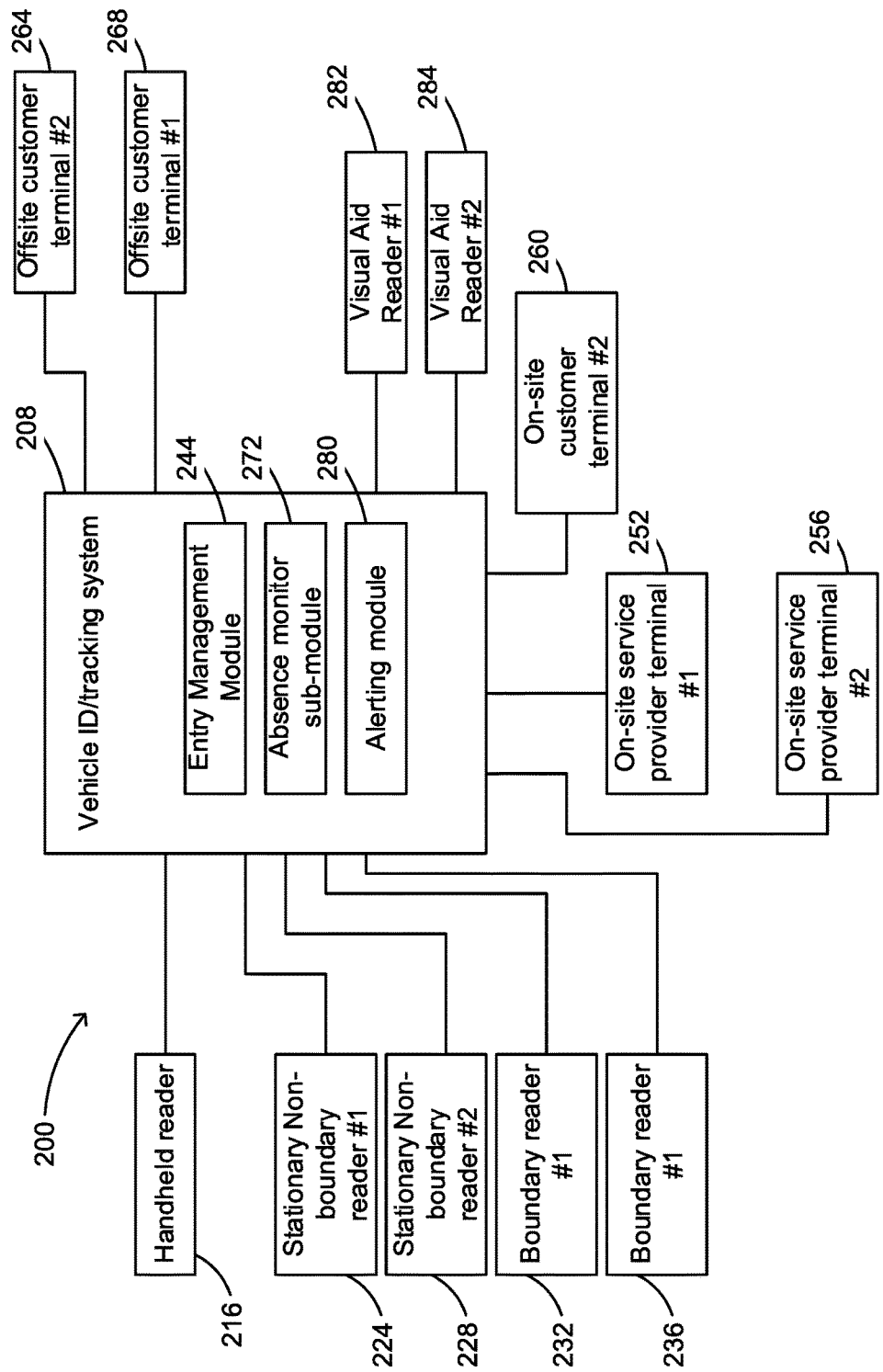
FIG. 6 illustrates a schematic diagram of a vehicle tracking system according to various exemplary embodiments.

Referring now to FIG. 6, therein illustrated is a schematic diagram of an exemplary vehicle tracking system 200 for tracking vehicles.

The vehicle tracking system 200 includes a tracking management system 208. The embodiments of the tracking management system 208 and methods performed thereon described herein may be implemented in hardware or software, or a combination of both. However, preferably, these embodiments are implemented in computer programs executing on programmable computers, each comprising at least one processor, a data storage system (including volatile and non-volatile memory and/or storage elements), at least one input device, and at least one output device. For example and without limitation, the programmable computers may be a mainframe computer, server, personal computer, laptop, personal data assistant, or cellular telephone. Program code is applied to input data to perform the functions described herein and generate output information. The output information is applied to one or more output devices in known fashion.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM or magnetic diskette) readable by a general or special purpose programmable computer for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

Furthermore, the system, processes and methods of the described embodiments of the tracking management system 208 are capable of being distributed in a computer program product comprising a computer readable medium that bears computer-usable instructions for one or more processors. The medium may be provided in various forms including one or more diskettes, compact disks, tapes, chips, wireline transmissions, satellite transmissions, internet transmission or downloadings, magnetic and electronic storage media, digital and analog signals, and the like. The computer-usable instructions may also be in various forms including compiled and non-compiled code.

The vehicle tracking system 200 further includes one or more portable readers 216 for reading remotely readable tags, such as RFID tags. These may be RFID tag of the first tag member 108, 608 and/or the RFID tag of the second tag member 156, 708.

The vehicle tracking system 200 further includes one or more stationary readers for reading the remotely readable tags. The stationary readers are classified into non-boundary readers and boundary readers. For example, the exemplary vehicle tracking system 200 has first and second stationary non-boundary readers 224, 228 and first and second stationary boundary readers 232, 236.

The tracking management system 208 includes an entry management module 244 for managing vehicle tracking entries. Each vehicle tracking entry may correspond to a vehicle being brought on-site and for which the location of the vehicle is to be tracked. For example, each vehicle tracking entry may include a tracking entry number, a unique identifier of the vehicle (ex: license plate or vehicle identification number (VIN)), vehicle information, and a current location of the vehicle. For example, the tracking entry number for a given vehicle tracking entry corresponds to the unique identification code associated to a remote readable tag placed in or on the vehicle corresponding to the given vehicle tracking entry. For example, the remote readable tag may be found in the exterior identification device 2 or identification 2 described herein according to various exemplary embodiments.

The tracking management system 208 can be in signal communication with one or more on-site service provider terminals, such as first on-site service provider terminal 252 and second on-site service provider terminal 256. The entry management module 244 can receive from one of the on-site service provider terminals 252, 256 a request to create a vehicle tracking entry for tracking the location of a given vehicle being brought on-site. The vehicle tracking entry request may include the unique identifier of the given vehicle and a unique identification code of a remote readable tag attached to the given vehicle to be used for tracking the vehicle. The vehicle tracking entry creation request may further include one or more maintenance actions to be performed on the given vehicle. More information for the given vehicle can be retrieved from a database of the tracking management system 208 if such information had previously already been stored.

The tracking management system 208 can be in signal communication with one or more on-site customer terminals 260. The tracking management system 208 can transmit to the on-site customer terminal 260 information relevant to a customer, such as the owner of the given vehicle being serviced. This information may include a current location of the vehicle within the tracking site. This information may also include remaining tasks that need to be completed and an estimated time remaining until completion of maintenance tasks.

The tracking management system 208 can be in signal communication with one or more off-site terminals, such as first off-site terminal 264 and second off-site terminal 268. For example, off-site terminals may be any electronic device operable to receive information from the tracking management system 208 (over a suitable network, such as the Internet. The tracking system 208 can transmit at least one alert to the off-site terminals 264, 268 information relevant to a customer, such as the owner of the given vehicle being serviced. This information may also include remaining tasks that need to be completed and an estimated time remaining until completion of maintenance tasks.

The off-site terminal 264, 268 may be any electronic user device operable to receive electronic information, such as a cell phone, smartphone, tablet, game console, laptop, or desktop. The alert may be sent as a text message, email, or other suitable electronic messaging type. The alert provides access to information pertaining to a tracking operation. For example, the alert may include a link, such as a hyperlink, for accessing the information, such as via a webpage. Alternatively or additionally, a tracking number may be provided within the alert. Entering the tracking number in a web portal accessed by the user device then allows further access to the information pertaining to the tracking operation.

The at least one alert may also be sent to one or more on-site service provider terminals 252, 256. For example, the service provider terminal may be a device being used by an on-site agent, such as a customer representative agent. The device may also be a cell phone, smartphone, tablet, laptop, desktop, or other portable device. Accordingly, the agent may be kept up-to-date with the status of a vehicle within a vehicle tracking operation.

According to various exemplary embodiments, the tracking management system 208 may further include one or more visual identifier readers, such as first visual identifier reader 282 and second visual identifier reader 282. The one or more visual identifier readers are operable to read machine-readable visual identifiers to obtain the code encoded in the identifiers. For example, the one or more visual identifier readers are bar code readers and are operable to identify the code encoded in bar codes.

The tracking management system 208 can receive from the portable reader 216 the value (ex: unique identification code) of a remotely readable tag that is read. The vehicle tracking system 200 also receives from the portable reader 216 a location of the portable reader 216 at the time that the remotely readable tag is being read. By receiving the value and the location, and matching the value with a stored vehicle tracking entry associated thereto, the tracking management system 208 can update the current location information associated to the vehicle tracking entry.

Figure 7:
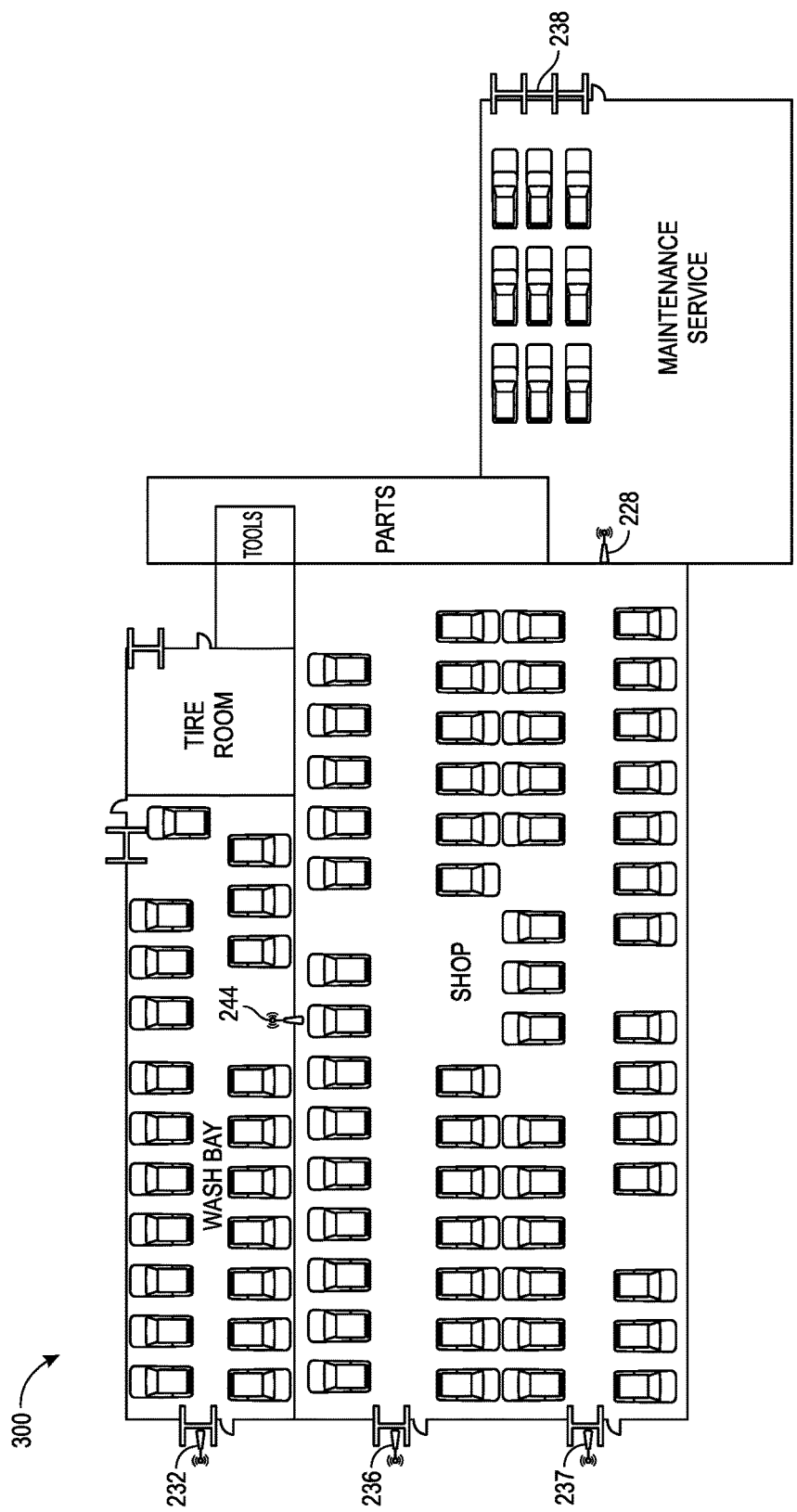
FIG. 7 illustrates a schematic diagram of an exemplary tracked premises.

Referring now to FIG. 7, therein illustrated is a schematic diagram of an exemplary tracked premises 300 on which a plurality of vehicles are stored and a plurality of stationary non boundary readers and stationary boundary readers are located. As illustrated, the first stationary non-boundary reader 224 is positioned within a washbay of the tracked premises 300 and the second stationary non-boundary reader 228 is positioned within a service area of the tracked premises 300. As further illustrated, first stationary boundary reader 232, second stationary boundary reader 236, third stationary boundary reader 237, and fourth stationary boundary reader 238 are located at exit points of the tracked premises 300, such as garage doors of the tracked premises 300.

The tracking management system 208 can receive from the stationary non-boundary readers 224, 228 the value (ex: unique identification code) of a remotely readable tag that is read. For example, the stationary non-boundary readers 224, 228 may each correspond to different physical sub-locations of the tracked premises 300. The tracking management system 208 can update the current location of the vehicle associated to the value that is read based on which stationary non-boundary reader it receives the code from and based on a known location of that stationary non-boundary reader. Alternatively, the tracking management system 200 can also update the current location of key of a vehicle associated to the value if the remotely readable tag that is read is attached to a key.

The tracking management system 208 can receive from the stationary boundary readers 232, 236, 237, 238 the value (ex: unique identification code) associated to a remotely readable tag that is read.

According to various exemplary embodiments, the tracking management system 208 is configured to track the location of a vehicle on the tracking site, including tracking absences of the vehicle from the tracked premises 300. Accordingly, the tracking management system 208 includes an absence monitoring sub-module 272 for tracking absences of vehicles from the tracked premises 300 and an alerting module 280 for transmitting an alert when a given vehicle's absence from the tracking site has exceeded a permitted absence.

When a new vehicle tracking request for a given vehicle is received at the request management module 244, an entry is made at the absence monitoring sub-module 272 to set an initial absence permission for the given vehicle to disallowed. For example, for a vehicle entry being associated to the unique identification code associated to the remotely readable tag placed on or in the given vehicle, the initial absence permission for that unique identification code is set to disallowed.

The absence monitor sub-module 272 further receives readings of values (ex: unique identification codes) associated to remotely readable tags made by one or more of the stationary boundary readers 232, 236, 237, and 238. It will be appreciated that a reading of a remotely readable tag by a stationary boundary reader represents a situation where a vehicle physically containing the remotely readable tag is entering or leaving the tracked premises. Where the vehicle is expected to already be located on the tracked premises, a reading at any one of the stationary boundary reader represents a situation where a vehicle is leaving the tracked premises.

When a reading of a remotely readable tag is received, the absence monitoring sub-module 272 checks whether the absence permission for the vehicle tracking entry associated to that value (ex: unique identification code) is set to allowed. The absence permission for the vehicle tracking entry associated to the read value being set to disallowed indicates that the vehicle carrying the remotely readable tag is leaving the premises without permission.

The alerting module 280 transmits an alert if one of the at least one boundary reading devices reads the remotely readable tag associated to the given unique identification code while the absence permission for the given unique identification code is set to disallowed. For example, the alert may be transmitted to one or more security devices, such as security barrier, a security monitoring system, or a portable device being carried by a security guard. For example, the alert may be any electronic message indicating a non-permitted absence of a vehicle from the premises.

The management module 244 may receive one or more event commands indicating an event for a given vehicle tracking entry. Such an event may be a completion of a particular maintenance task within a list tasks to be completed or the completion of all tasks for the vehicle.

In response to receiving an event command, the absence monitor sub-module 272 may set the absence permission for the given vehicle tracking entry or the unique identification code associated thereto to temporarily allowed or permanently allowed based on the type of event command received.

For example, the absence permission may be set to temporarily allowed where the vehicle of a vehicle tracking entry is allowed to leave the premises for a predetermined amount of time. For example, such event commands may be a maintenance test drive, a client test drive, an off-site servicing, or a courtesy rental of a vehicle. In addition to setting the absence permission to allowed, an allowed amount of time may be indicated by the absence monitoring sub-module 272. For example, the amount of time may be chosen based on the type of event command, wherein different types of events may have different amount of time of allowed absence.

Where a reading of a remotely readable tag is received and the absence monitoring sub-module 272 determines that the absence permission for the vehicle tracking entry associated to that remotely readable tag is set to temporarily allowed, the absence monitoring sub-module 272 sets the current status for the vehicle tracking entry associated to the remotely readable tag to off-site. Furthermore, the absence monitor sub-module 272 triggers the start of a timer associated to the given vehicle tracking entry to track the amount of time the vehicle is off-site.

The absence monitoring sub-module 272 further monitors whether the vehicle corresponding to the vehicle tracking entry has returned to the premises. For example, a further reading of the remotely readable tag associated to the vehicle tracking entry at any one of the boundary readers indicates that the vehicle has returned to the premises. In response, the timer for tracking the amount of time the vehicle is off-site is turned off. Furthermore, the absence permission for the vehicle is set back to disallowed.

The absence monitoring sub-module 272 further monitors whether the vehicle corresponding to the vehicle tracking entry has been off-site for an amount of time that exceeds the permitted amount of time. Where the timer associated to the vehicle being off-site exceeds the permitted amount of time, the alerting module sends another alert.

Figure 8A:
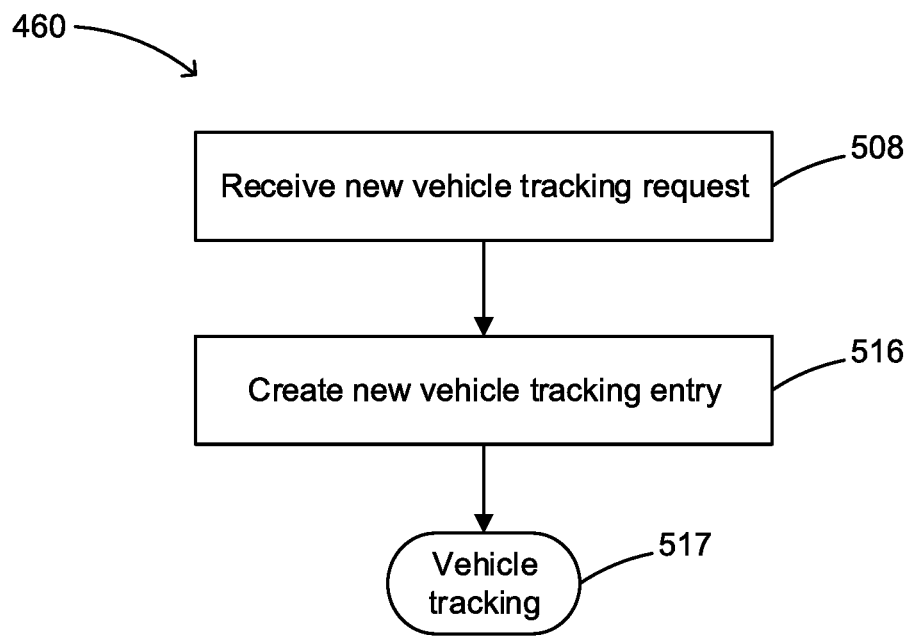
FIG. 8A illustrates a flowchart of the general operational steps of an exemplary method for initializing vehicle tracking.

Referring now to FIG. 8A, therein illustrated is a flowchart of the general operational steps of an exemplary method 460 for initializing vehicle tracking. For example, the method 460 may be carried out at the vehicle tracking system 208.

At step 508, a new vehicle tracking request is received for a given vehicle being associated with a given unique identification code. For example, the new vehicle tracking request may be made by a user interacting with one of the on-site service provider terminals 252, 256.

At step 516, a new vehicle tracking entry 408 is created. For example, the entry may be created by the entry management module 244 and stored at the vehicle tracking system 208.

At step 517, tracking of a vehicle identified by the newly created vehicle tracking entry 408 may begin.

According to various examples, a first of the alerts may be transmitted to a user device associated to the vehicle being tracked upon initializing the vehicle tracking operation. The alert may be transmitted to an offsite customer terminal 264, 268. The alert may also be transmitted to an on-site service provider terminal 252, 256.

Figure 8B:
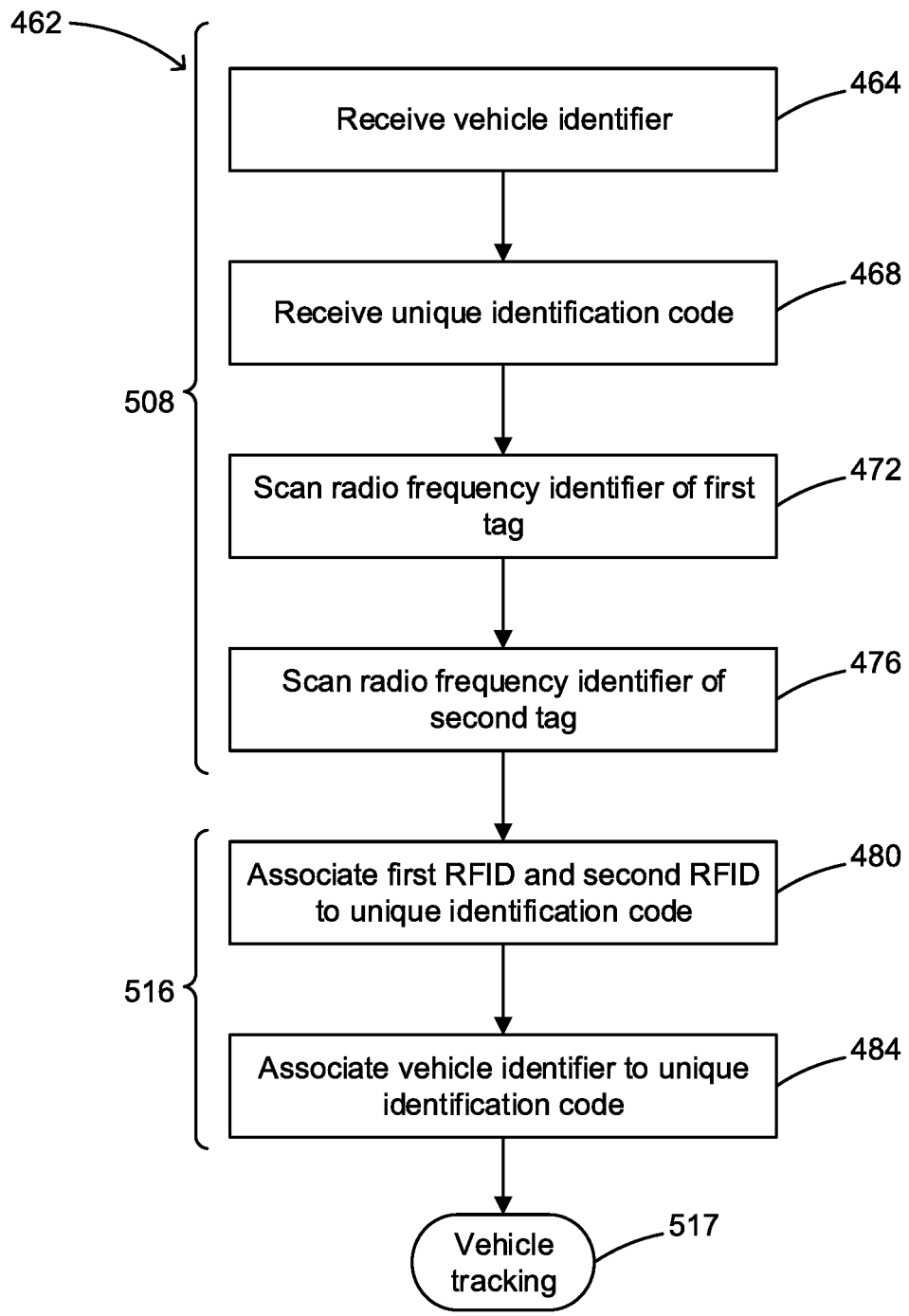
FIG. 8B illustrates a flowchart of the general operational steps of an exemplary detailed method for initializing vehicle tracking.

Referring now to FIG. 8B, therein illustrated is a flowchart of the general operational steps of an exemplary detailed method 462 for initializing vehicle tracking. For example, the method 460 may be carried out at the vehicle tracking system 208.

At step 464, a vehicle identifier is received. The vehicle identifier may be a unique identifier that identifies a vehicle to be tracked during the vehicle tracking operation. For example, the vehicle identifier may be the vehicle identification number (VIN) of the vehicle. The vehicle identifier may be received from a bar code reader scanning a bar code displayed on the vehicle, reading a remote readable tag (ex: embedded RFID) of the vehicle, or a user manually entering vehicle identification information via an on-site service provider terminal 252, 256.

At step 468, an unique identification code 414 for the tracking operation is received. For example, the unique identification code 414 may be the unique identification code displayed on the first tag member or second tag member of the exemplary identification kits described herein. For example, the unique identification code 414 may be received from a bar code scanner scanning the bar code visual identifier 654, 656 of first tag member 608 or visual identifier 754 second tag member 708 of an exemplary identification kit 780. For example, the unique identification code 414 may be received in a user request made by a user interacting with the on-site service provider terminal 252, 256.

The steps 464 and 468 may correspond to sub-steps of step 508 for receiving a new vehicle tracking request. For example, receiving either a vehicle identifier at step 464 or receiving the unique identification code at step 468 may be understood as receiving a new vehicle tracking request.

At step 480, the vehicle identifier received at step 464 is associated to the unique identification code received at step 468. The association creates a logical data link between the vehicle identifier and the unique identification code within the storage of the vehicle tracking system 208 such that use of either the vehicle identifier or the unique identification code allows retrieval of the other of the vehicle identifier and the unique identification code.

At step 484, at least the RFID of the first tag member (108, 608) is associated to the unique identification code. The association creates a logical data link between the RFID and the unique identification code within the storage of the vehicle tracking system 208.

According to various exemplary embodiments, a value of the RFID and the unique identification code are not the same. This may be the case where the RFID is preprogrammed to have a unique serial number value separately from assignment of the unique identification code of the visual identifier of the first tag member (108, 608). Accordingly, the value of the RFID is associated to the unique identification code within the storage of the vehicle tracking system 208. For example, step 484 may further include scanning the RFID of the first tag member to read the value of the RFID so as to permit association of the RFID value with the unique identification code within the vehicle tracking system 208.

According to other exemplary embodiments, the value of the RFID and the unique identification code are equal. This may be the case where the RFID is preprogrammed at the time of the fabrication of the first tag member 108, 608 to have the same identifier value as the unique identification code of the visual identifier of the first tag member 108, 608. Accordingly, the value of the RFID tag is associated to the unique identification code as a result of their having the same value.

According to yet other exemplary embodiments, the RFID is writable. Accordingly, associating the RFID of the first tag member 108, 608 includes writing a value to the RFID and associating this value to the unique identification code. For example, the written value may be equal to the unique identification code.

Step 484 may also include associating the RFID of the second tag member 156, 708 to the unique identification code. In this case, the second tag member 156, 708 may have a unique identification code corresponding to the unique identification code of the first tag member 108, 608. Associating the value of the RFID of the second tag member 156, 708 to the unique identification code may be carried out in a similar way as associating the value RFID of the first tag member 108, 608 to the unique identification code, as described herein.

Figure 8C:
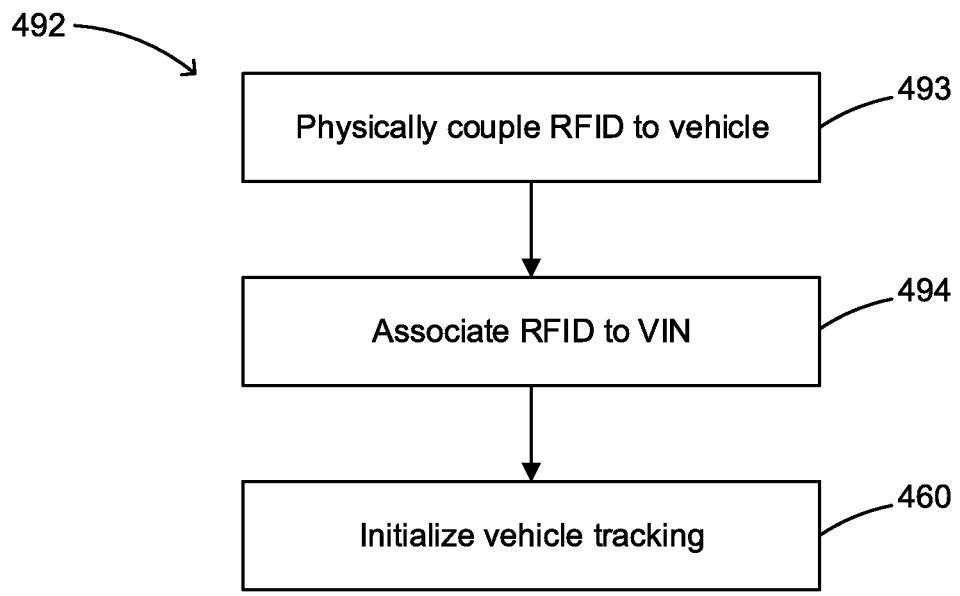
FIG. 8C illustrates a flowchart of the general operational steps of an exemplary method for preparing a vehicle for using a vehicle tracking operation.

Referring now to FIG. 8C, therein illustrated is a flowchart of the general operational steps of an exemplary method 492 for preparing a vehicle for use in a vehicle tracking operation.

At step 493, a remotely readable tag having a RFID is physically coupled to a vehicle to be tracked. Physically coupling herein refers to the remotely readable tag being joined to the vehicle such that it is displaced with the displacing of the vehicle. Accordingly, a location of the remotely readable tag represents a location of the vehicle.

At step 494, the value of the RFID is associated to the vehicle information number of the vehicle to be tracked. The associating may be made in a database, such as a storage device of the tracking management system 208.

Initializing of the vehicle tracking is carried out according to method 460 or method 462 as described herein.

It will be appreciated that the steps 493, 494 and method 460 within method 492 may be carried out in a different order than as illustrated in the example of FIG. 8C.

For example, the remotely readable tag that is physically coupled to the vehicle is the first readable tag 108, 608 as described herein. Accordingly, the RFID and/or visual identifier 654, 656 is first scanned (ex: at step 508 and 472) during initialization of the vehicle tracking. The value of the RFID of the first readable tag 108, 608 may also be associated to the vehicle identification number through the association to the unique identification code. The first readable tag having the RFID is then physically coupled to the vehicle, such as being adhered to or hung onto the rearview mirror, window and/or windshield.

In another example, the RFID is physically coupled to the given vehicle at the time of the manufacturing of the vehicle. The RFID may be embedded in the vehicle. The value of the RFID can also be associated to the vehicle identification number at that time. Accordingly, the vehicle is prepared for use in a vehicle tracking operation when being manufactured. It will be appreciated that this may be well in advance of any vehicle tracking operation. Subsequently, the RFID may be scanned at a dealership or maintenance garage having access to the stored RFID value and vehicle identification number. This scanning of the RFID may cause the transmitting of a vehicle tracking request, which is received at the tracking management system 208 at step 508. For example, the new vehicle tracking request is received as a result of the RFID being scanned as the vehicle is initially driven up to a reading device of the dealership or maintenance garage.

In yet another example, the RFID is physically coupled to the given vehicle at the time of the delivering of the vehicle from a dealership. This may correspond to a vehicle being sold by the dealership. The RFID may be associated to the vehicle identification number along with entering of information pertaining to the sale, such as date of sale, owner, location, etc. Accordingly, the vehicle is prepared for use in a vehicle tracking operation when being delivered. It will be appreciated that this may be well in advance of any vehicle tracking operation. Subsequently, the RFID may be scanned at the dealership or maintenance garage having access to the stored RFID value and vehicle identification number. This scanning of the RFID may cause the transmitting of a vehicle tracking request, which is received at the tracking management system 208 at step 508. For example, the new vehicle tracking request is received as a result of the RFID being scanned as the vehicle is initially driven up to a reading device of the dealership or maintenance garage.

Figure 9A:
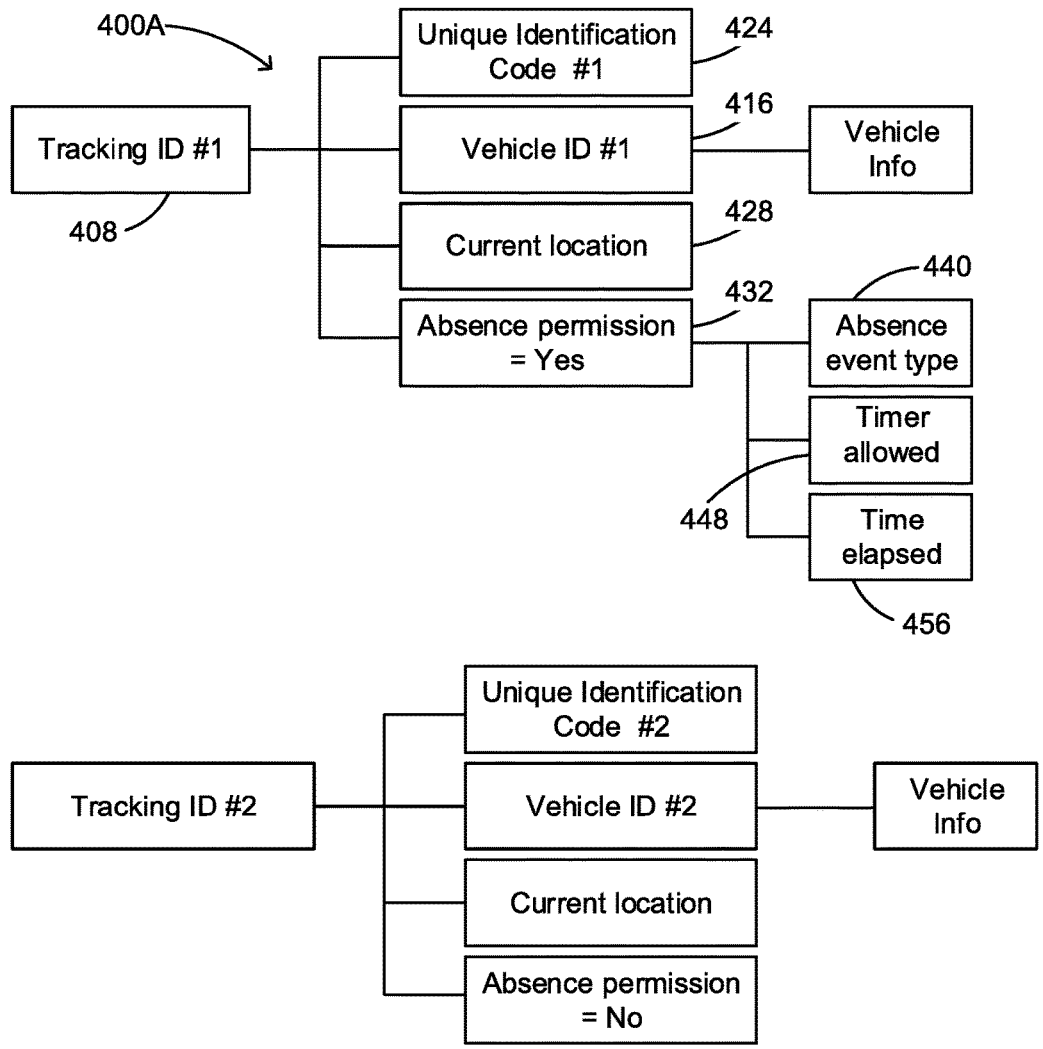
FIG. 9A illustrates a schematic diagram of an exemplary data structure of a tracking management system.

Referring now to FIG. 9A, therein illustrated is a schematic diagram of an exemplary data structure 400a of the tracking management system 208 for tracking a status of a vehicle. The data structure 400 includes a vehicle tracking entry ID 408 for identifying the vehicle tracking entry. For example, the vehicle tracking entry ID can be unique so as to allow both current tracking and recording historical data. The tracking entry ID 408 can be associated to a unique identifier 416 of a vehicle, the unique identification code 424 of the remotely readable tag carried by the vehicle (ex: first tag member 108, 608), a current location 428 of the vehicle, and an absence permission entry 432 of the vehicle. In some exemplary embodiments, the vehicle tracking entry ID 408 is the unique identification code, and only one of the tracking ID 408 or the unique identification code entry 424 is provided. The absence permission entry 432 can be further associated to an absence event type 440 and an allowed timer 448 for the absence event. The absence permission entry 432 can be further associated to an ongoing timer 456 that tracks the time elapsed since the beginning of the timer.

Figure 9B:
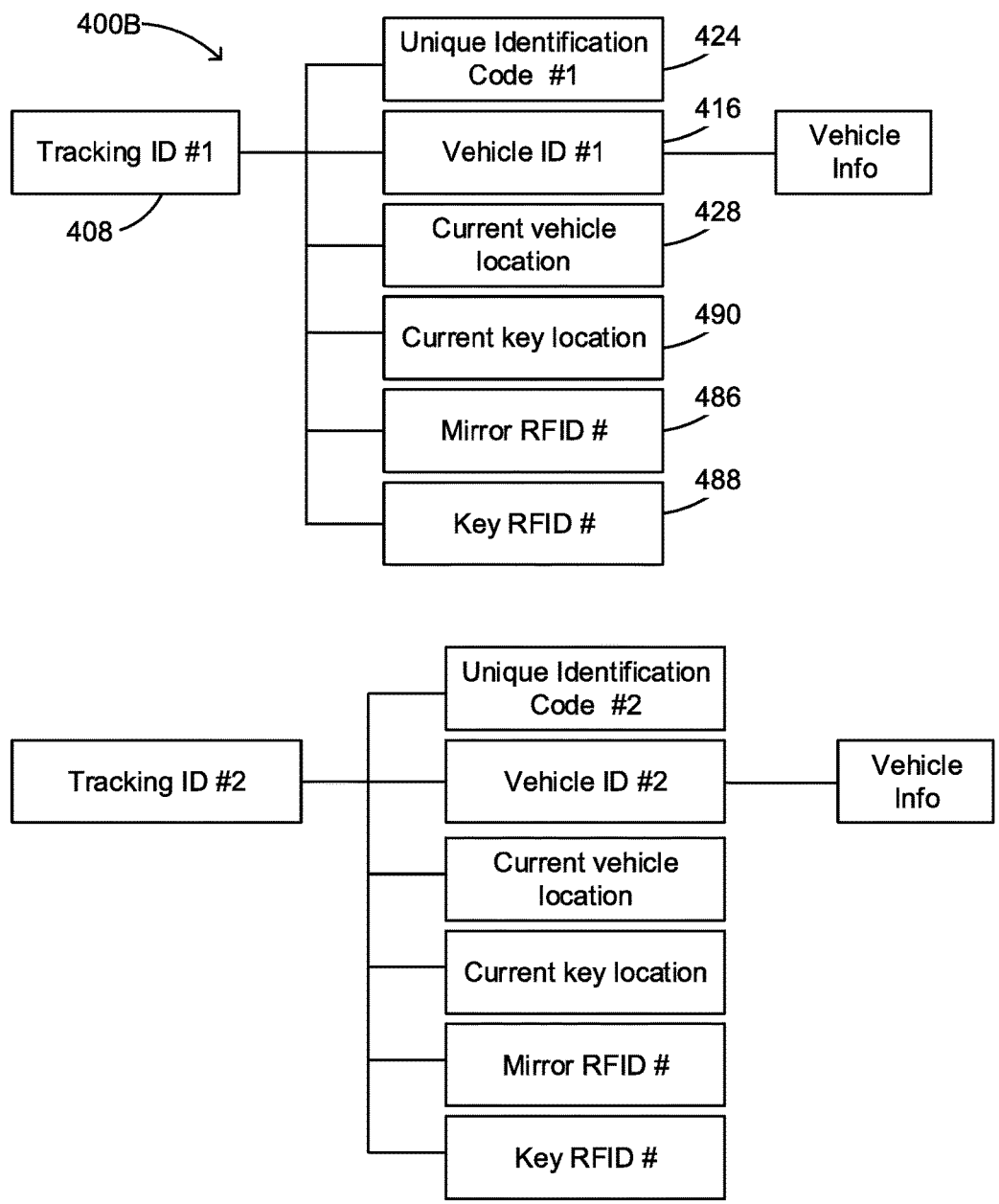
FIG. 9B illustrates a schematic diagram of an exemplary data structure of a tracking management system.

Referring now to FIG. 9B, therein illustrated is a schematic diagram of another exemplary data structure 400b of the tracking management system 208 for tracking a status of a vehicle. The data structure 400b also includes a vehicle tracking ID 408, the unique identifier 416 of the vehicle, the unique identification code 424 and a current location 428 of the vehicle. The data structure further includes a RFID value 486 of the first tag member 108, 608 and a RFID value 488 of the second tag member 156, 708. The first RFID value 486 and the second RFID value 488 may be different so as to distinguish between which of the RFIDs is being read. The data structure 400b further includes a current key location 490. The current key location may be different from the current vehicle location 428.

It will be appreciated that having a current key location entry 490 and a current vehicle location entry 428 allows tracking the physical location of a vehicle and the physical location of the key for that vehicle. There may be situations where the key become separated from the vehicle. Tracking the location of the keys allows for locating of the keys in such situations.

In other situations, keys for a plurality of vehicles may be placed together. This may be the case where a first set of keys are placed together, such as in a container, for a first purpose (ex: car wash), and a second set of keys are placed together elsewhere, such as in another container, for a second purpose (ex: tire changes). It is possible that a particular key is placed with the wrong set of keys, which makes finding that particular key difficult. Tracking the locations of the keys allows quickly locating in which set the particular key has been placed in cases of misplacement.

According to various exemplary embodiments, data structures 400a and 400b may be combined. For example, data structure 400b may also include entries 432, 440, 448 and 456 to permit tracking of absences of the vehicle identified by the vehicle identifier entry 416.

Figure 10:
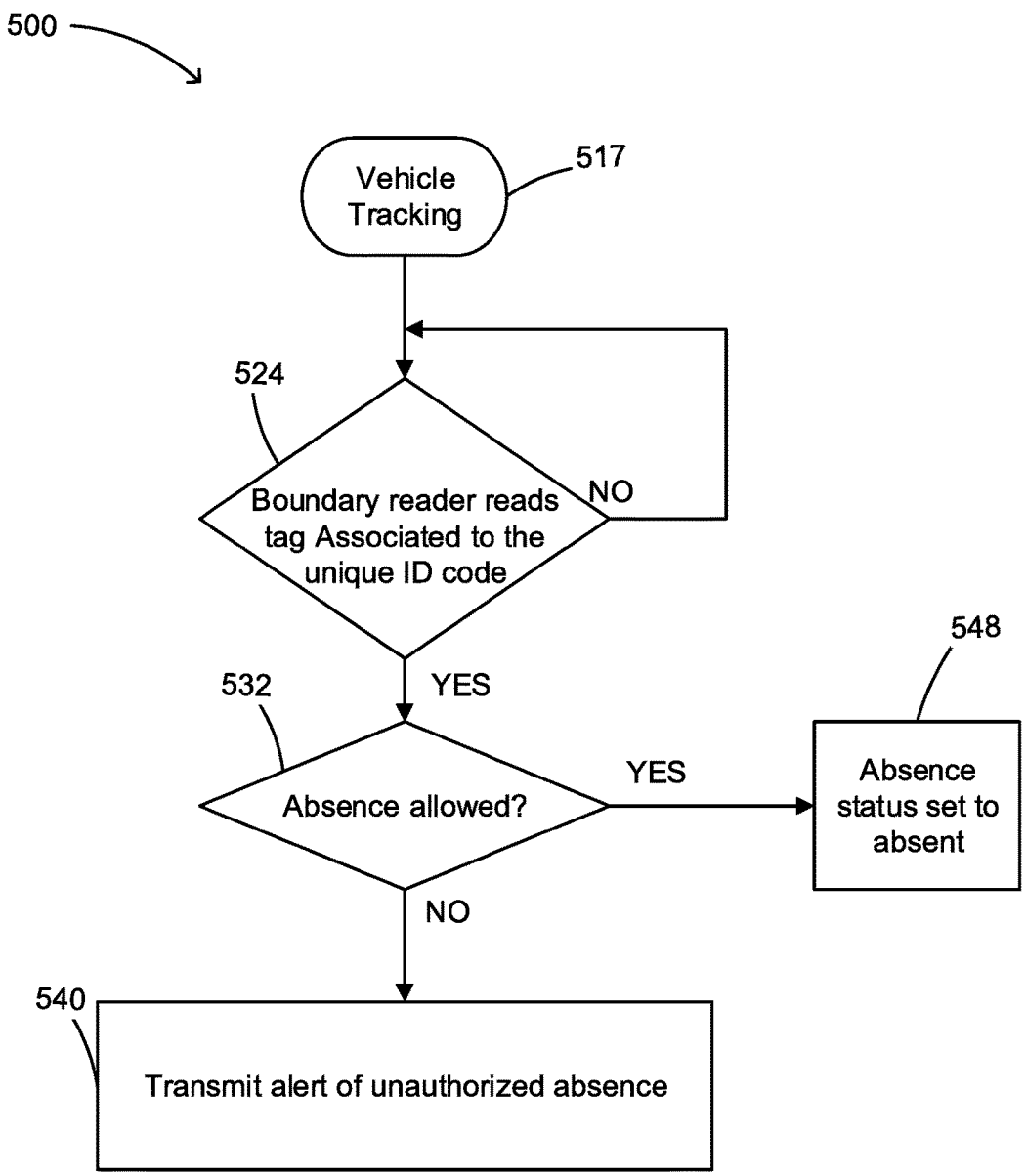
FIG. 10 illustrates a flowchart of the general operational steps of an exemplary method for tracking a vehicle.

Referring now to FIG. 10, therein illustrated is a flowchart of the general operational steps of an exemplary method 500 for tracking the location of a vehicle. For example, the method 500 may be carried out at the vehicle tracking system 208.

At step 517 a vehicle tracking operation for a given vehicle has been initialized.

At step 524, remotely readable tags are intermittently being read, each tag being associated with a respective unique identification code of the tracking operation. Remotely readable tags are intermittently being read at least one boundary reading device.

If a remotely readable tag is read by a boundary reading device at step 524, the method proceeds to step 532.

At step 532, it is determined whether the absence permission for the vehicle tracking entry associated to the unique identification code of the tag read at step 524 is set to allowed.

If the absence permission is set to disallowed when the tag is read at step 524, the method proceeds to step 540 to transmit an alert indicate an unauthorized absence of the vehicle corresponding to the vehicle tracking entry associated to that unique identification code of the tag that was read at step 524.

If the absence permission is set to allowed when the tag is read at step 524, the method proceeds to step 548 to set within the vehicle tracking entry the absence status to absent.

Figure 11:
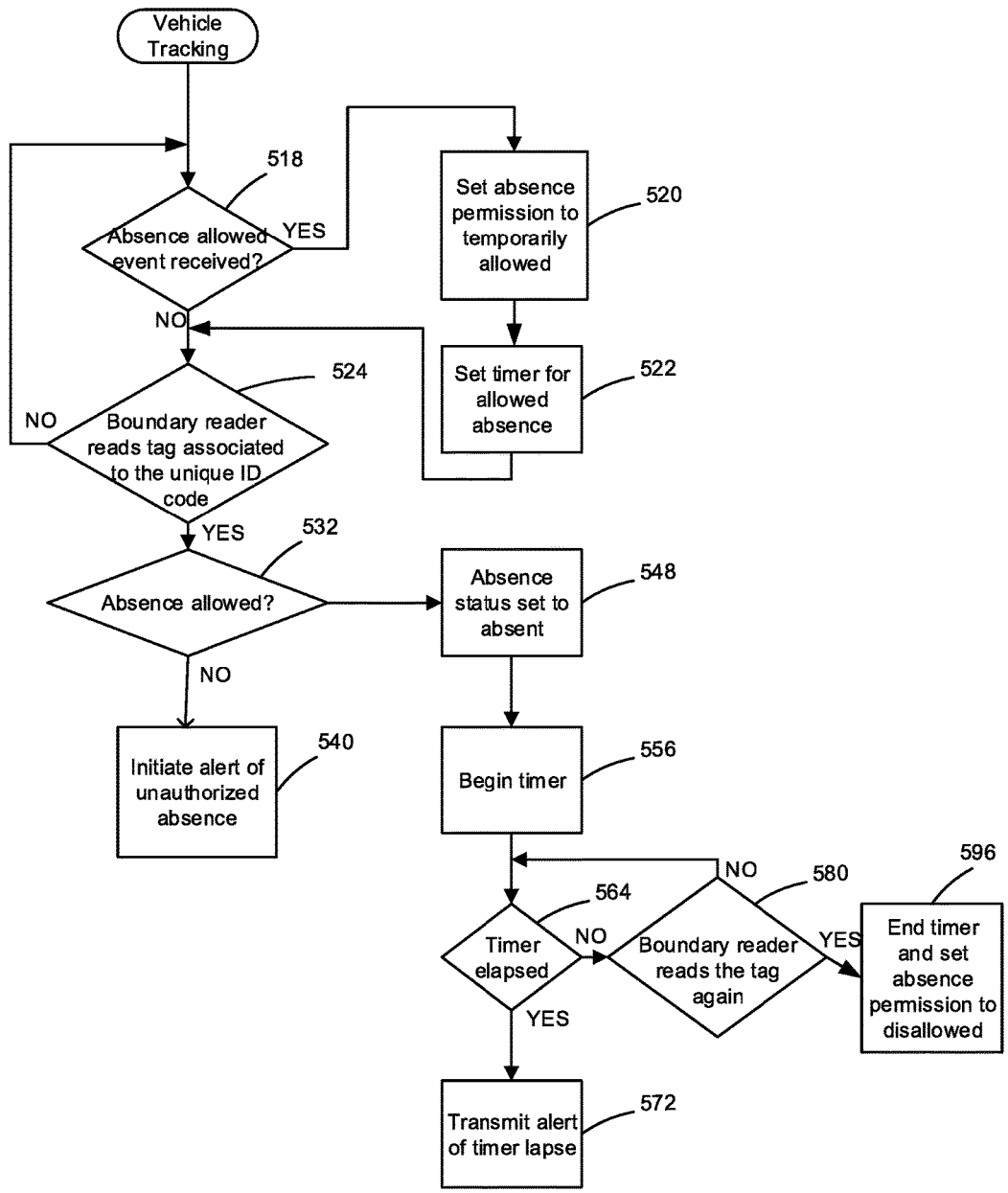
FIG. 11 illustrates a flowchart of the general operational steps of an exemplary detailed method for tracking a vehicle.

Referring now to FIG. 11, therein illustrated is a detailed flowchart of the general operation steps of exemplary method 500 for tracking the location of a vehicle.

After creating the new vehicle tracking entry 408 at step 516, monitoring of whether an event command for the vehicle tracking entry 408 is received is carried out at step 518.

If an event command is received at step 518, at step 520 the absence permission for the vehicle tracking entry 408 is set to temporarily allowed. Furthermore, at step 522, a timer corresponding to a time that the vehicle is allowed to be off-site is set for the vehicle tracking entry 408.

If the absence permission is set to allowed when the tag is read at step 524, the method proceeds to step 548 to set within the vehicle tracking entry the absence status to absent. The timer associated to the vehicle tracking entry 408 is triggered to begin counting at step 556.

At step 564, monitoring of whether the timer triggered at step 556 has elapsed.

If the timer has elapsed at 564, at step 572 an alert is transmitted to indicate that the vehicle has been off-site for an amount of time that exceeds its permitted absence time.

If the timer has not elapsed, the method proceeds to step 580 to determine whether a remotely readable tag associated to the unique identification code corresponding to the vehicle tracking entry has been read in a second instance to indicate the return of the vehicle being tracked.

If the remotely readable tag associated to the unique identification code corresponding to the vehicle tracking entry has been read in a second instance at step 580, the timer is ended at step 596 and the absence permission for the vehicle tracking entry is set to disallowed.

Figure 12:
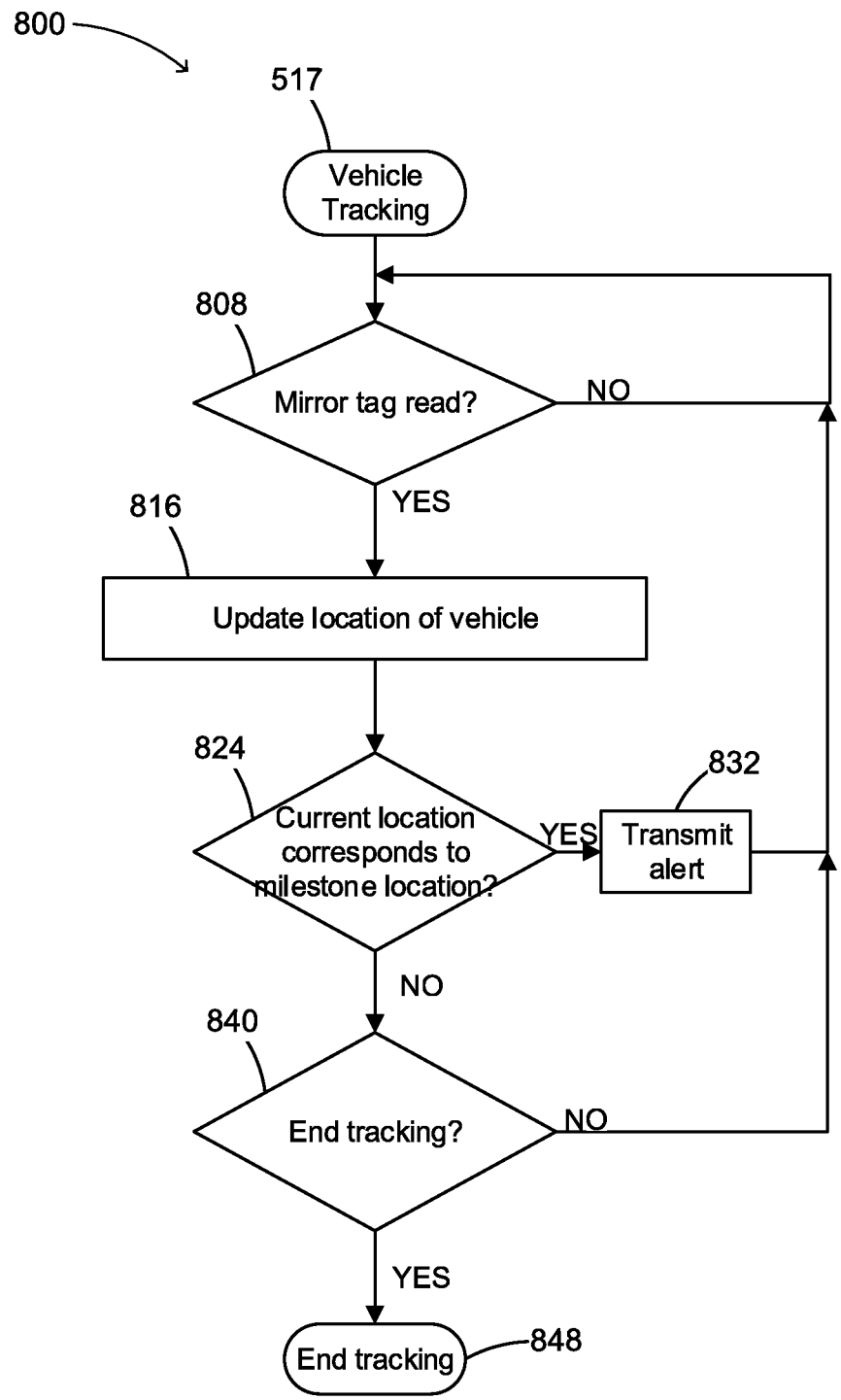
FIG. 12 illustrates a flowchart of the general operation steps of an exemplary method for tracking a vehicle.

Referring now to FIG. 12, therein illustrated is a flowchart of the general operational steps of an exemplary method 800 for tracking a vehicle. The method 800 may be carried out at the vehicle tracking system 208.

At step 517 a vehicle tracking operation for a given vehicle has been initialized. The initialization may further define a tracking type. For example, during initialization, it may be defined that the vehicle is to undergo maintenance. The type of maintenance may be further defined. The initialization may further define one or more milestone locations. The defined milestone locations may depend on the tracking type. The milestone locations may correspond to important points in the tracking operation. For example, the tracking type may be tracking maintenance of a vehicle and the milestone locations may correspond to completing important stages of the maintenance of the vehicle.

At step 808, remotely readable tags are intermittently being read, each tag being associated with a respective unique identification code of the tracking operation.

Remotely readable tags may be intermittently read by the handheld reader 216 and/or stationary readers 224, 228, 232 or 236.

If a remotely readable tag having a value associated to the unique identification code for the given vehicle of the vehicle tracking operation (step 517) is read, the method proceeds to step 816. For example, the first tag member 108, 608 is read at step 808.

At step 816, the current location of the given vehicle is updated. For example, current location entry 428 is updated. The location is updated to correspond to the location of the reading device 216, 224, 228, 232 or 236 that read the remotely readable tag at step 808.

At step 824, it is determined whether the current location of the given vehicle corresponds to one of the defined milestone locations.

If there is correspondence with one of the milestone locations, the method proceeds to step 832 to transmit an alert. The alert may be an electronic message providing information about the progress through the vehicle tracking operation. For example, the information is about the progress of the vehicle during its maintenance. The progress information that is transmitted corresponds to the milestone location reached.

If there is no correspondence, the method proceeds to step 840 to determine if the tracking operation is to be ended. The tracking operation may be ended when a final milestone location is reached or where a request is made to end the tracking operation.

The tracking operation is terminated at step 848. Alternatively, the method returns to step 808 to continue reading remotely readable tags.

According to various exemplary embodiments, a further alert may be transmitted upon completing a vehicle tracking operation. For example, the alert may be used to indicate that a maintenance of the vehicle is complete and that the vehicle is ready to be picked up. The alert may be transmitted to an offsite customer terminal 264, 268. The alert may also be transmitted to an on-site service provider terminal 252, 256.

According to various exemplary embodiments, alerts are automatically transmitted upon initializing the vehicle tracking operation and upon completing the vehicle tracking operation. Accordingly, a user of an electronic user device receiving the transmitted alert perceives a positive action (ex: the reception of the alert). This may be useful to alert the user where the user may be more passive and would not otherwise take positive steps to keep up-to-date with the vehicle tracking operation.

Figure 13:
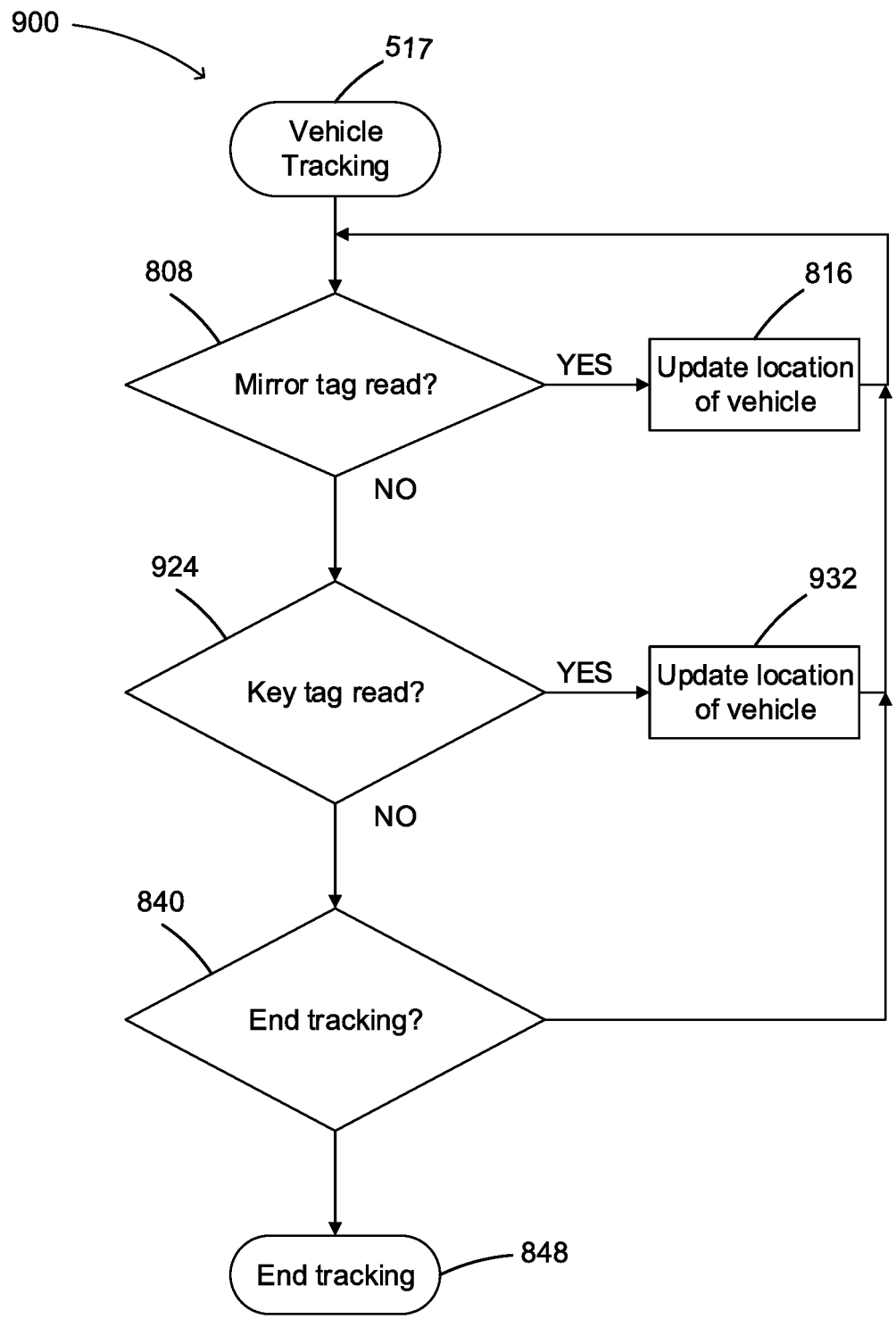
FIG. 13 illustrates a flowchart of the general operational steps of an exemplary method for tracking a vehicle.

Referring now to FIG. 13, therein illustrated is a flowchart of the general operational steps of an exemplary method 900 for tracking a vehicle. The method 900 may be carried out at the vehicle tracking system 208.

At step 517 a vehicle tracking operation for a given vehicle has been initialized.

At step 908, remotely readable tags are intermittently being read, each tag being associated with a respective unique identification code of the tracking operation. Remotely readable tags may be intermittently read by the handheld reader 216 and/or stationary readers 224, 228, 232 or 236.

If a remotely readable tag having a value associated to the unique identification code for the given vehicle of the vehicle tracking operation (step 517) is read, the method proceeds to step 916. For example, the first tag member 108, 608 is read at step 808.

At step 916, the current location of the given vehicle is updated. For example, current location entry 428 is updated. The location is updated to correspond to the location of the reading device 216, 224, 228, 232 or 236 that read the remotely readable tag at step 908.

If the value of a remotely readable tag associated to a given vehicle (ex: first tag member 108, 608) is not read, the method further proceeds to step 924 to determine if a remotely readable tag having a value associated to a key of the given vehicle has been read. For example, it is determined whether the second tag member 156, 708 is read at step 924.

If a remotely readable tag having a value associated to the key of the given vehicle has been read at step 924, the method proceeds to step 932.

At step 932, the current location of the key of the given vehicle is updated. For example current location entry 490 is updated. The location is updated to correspond to the location of the reading device 216, 224, 228, 232 or 236 that read the remotely readable tag at step 924.

If neither first tag member 108, 608 nor second tag member 156, 708 is read, the method proceeds to step 848 determine if the tracking operation is to be ended. The tracking operation may be ended when a final milestone location is reached or where a request is made to end the tracking operation.

The tracking operation is terminated at step 848. Alternatively, the method returns to step 808 to continue reading remotely readable tags.

Various exemplary embodiments for vehicle tracking described herein advantageously increase dealer's transparency. For example, vehicle maintenance has often been perceived as lacking transparency because a customer does not know what was done to the vehicle during maintenance. By contrast, according to various exemplary embodiments described herein, via alerts transmitted and logging of vehicle locations, a customer bringing a vehicle for service can easily track where the vehicle is in real-time and/or has been from the time the vehicle is brought to the tracked premises to the time the vehicle is returned to the customer. This type of "open door" policy assists in improving a customer's level of trust for the service providers at the tracked premises.

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

The invention claimed is:

1. A kit comprising:
   a base member adapted to be releasably attached to an upper region of a vehicle;
   a pole member comprising a first end that is adapted to be releasably coupled to the base member;
   an identification tag adapted to be mounted on the pole member and at a predetermined distance from the first end; and
   a light adapted to be positioned on the pole member,
   wherein the identification tag is an RFID tag being associated to a unique identification code and the light is configured to be illuminated when the RFID tag is queried by a signal corresponding to the unique identification code.

2. The kit of claim 1, wherein the identification tag is adapted to be mounted at a second end of the pole member and at the predetermined distance from the first end.

3. The kit of claim 1, wherein the length of the pole member is about 30 cm to about 90 cm.

4. The kit of claim 1, wherein the predetermined distance is about 30 cm to about 90 cm.

5. The kit of claim 1, wherein when the pole member is coupled to the base member and the base member is attached to the upper region of the vehicle, the identification tag is positioned at a height of about 30 cm to about 60 cm above the roof of the vehicle.

6. The kit of claim 1, wherein the base member includes a suction cup.

7. The kit of claim 6, wherein the suction cup is releasably attachable to a windshield of the vehicle.

8. The kit of claim 6, wherein the suction cup is releasably attachable to a roof of the vehicle.

9. The kit of claim 6, wherein the suction cup is adapted to maintain a binding with the windshield or the roof of a vehicle at a temperature of about −40 degrees Celsius to about 50 degrees Celsius.

10. The kit of claim 1, wherein the base member comprises a clip adapted to be mounted over a top edge of a scrollable window of the vehicle.

11. The kit of claim 10, wherein the clip comprises a first leg and a second leg opposite the first leg and wherein the pole member extends from the first leg.

12. The kit of claim 11, wherein the clip is mounted to the scrollable window through a pinching of the clip between the scrollable window and a bottom side of a roof of the vehicle.

13. The kit of claim 1, wherein the pole member is substantially flexible.

14. The kit of claim 1, wherein the light is adapted to be positioned at the second end of the pole member.

15. The kit of claim 1, further comprising a receiver adapted to be in signal communication with the light, the receiver being associated to a unique identification code and being configured to illuminate the light when a signal corresponding to the unique identification code is received thereat.

16. A method of mounting an identification device to a vehicle, the method comprising:
    attaching a base member to an upper region of a vehicle;
    positioning a pole member coupled to the base member to a substantially upright position, whereby a remotely readable tag positioned on the pole member is positioned to a predetermined height above the upper region of the vehicle; and
    attaching a light to the pole member, the light being configured to be illuminated when a receiver in signal communication with the light receives a signal corresponding to a unique identification code associated to the receiver,
    wherein the remotely readable tag is positioned at a height of at about 30 centimeters to about 90 centimeters above the upper region of the vehicle.

17. The method of claim 16, wherein the upper region comprises one or more of a hood, side mirror, front windshield, rear windshield, side windows, roof and truck door of the vehicle.

18. The method of claim 16, further comprising positioning the remotely readable tag to the distal end of the pole member.

19. A kit comprising:
    a base member adapted to be releasably attached to an upper region of a vehicle;
    a pole member comprising a first end that is adapted to be releasably coupled to the base member;
    an identification tag adapted to be mounted on the pole member and at a predetermined distance from the first end; and
    a light adapted to be positioned on the pole member,
    wherein when the pole member is coupled to the base member and the base member is attached to the upper region of the vehicle, the identification tag is positioned at a height of about 30 cm to about 60 cm above the roof of the vehicle.

20. A kit comprising:
    a base member adapted to be releasably attached to an upper region of a vehicle;
    a pole member comprising a first end that is adapted to be releasably coupled to the base member;

an identification tag adapted to be mounted on the pole member and at a predetermined distance from the first end;
a light adapted to be positioned on the pole member; and
a receiver adapted to be in signal communication with the light, the receiver being associated to a unique identification code and being configured to illuminate the light when a signal corresponding to the unique identification code is received thereat.

* * * * *